United States Patent [19]

Nakajima

[11] Patent Number: 5,578,984
[45] Date of Patent: Nov. 26, 1996

[54] TIRE AIR PRESSURE REDUCTION DETECTING METHOD AND APPARATUS

[75] Inventor: Mikao Nakajima, Osaka, Japan

[73] Assignees: Sumitomo Electric; Sumitomo Rubber Ind., Hyogo, Japan

[21] Appl. No.: 330,740

[22] Filed: Oct. 28, 1994

[30] Foreign Application Priority Data

Nov. 4, 1993 [JP] Japan ................................. 5-275553
Nov. 16, 1993 [JP] Japan ................................. 5-287021
Nov. 17, 1993 [JP] Japan ................................. 5-288429

[51] Int. Cl.$^6$ ................................................. B60C 23/00
[52] U.S. Cl. .................... 340/444; 340/442; 340/443; 340/445; 73/146.2; 73/146.3; 73/146.4; 73/146.5
[58] Field of Search .............................. 340/444, 443, 340/445, 442, 671; 73/507, 509, 510, 146.2, 146.3, 146.4, 146.5; 180/197

[56] References Cited

U.S. PATENT DOCUMENTS

| 3,613,075 | 10/1969 | Griffiths ................................ 340/58 |
| 3,691,524 | 9/1972 | Frost et al. ........................... 340/58 |
| 4,355,297 | 10/1982 | Sinha et al. .......................... 340/58 |
| 4,574,267 | 3/1986 | Jones .................................... 340/58 |
| 4,876,528 | 10/1989 | Walker et al. ....................... 340/442 |
| 5,192,929 | 1/1991 | Walker et al. ....................... 340/444 |

FOREIGN PATENT DOCUMENTS

| 0552827 | 7/1993 | European Pat. Off. . |
| 06092114 | 4/1994 | Japan . |
| WO94/06641 | 3/1994 | WIPO . |

OTHER PUBLICATIONS

English Abstract For Japanese Publication No. 060921114A.

Primary Examiner—Jeffery Hofsass
Assistant Examiner—Davetta Woods
Attorney, Agent, or Firm—Beveridge, DeGrandi, Weilacher & Young L.L.P.

[57] ABSTRACT

According to the tire air-pressure reduction detecting apparatus and method of the present invention, when a vehicle travels, the detected rotational angular speeds $F_i$ of the tires $W_i$ are multiplied by correction coefficients $C_i$ to correct initial differences. Vehicle speed $V_0$ is calculated based on angular speeds $F_{i0}$, and is put in a relationship formula $f(V)$ to obtain a front/rear wheel ration $f(V_0)$ corresponding to the speed $V_0$. Based on the front/rear wheel ratio $f(V_1)$ corresponding to a speed $V_1$ at which the correction coefficients $C_i$ have been obtained, and the ration $f(V_0)$, there is obtained a variation of the front/rear wheel ratio $f(V_0)/f(V_1)$, by which rotational angular speeds $F_3$, $F_4$ are then multiplied. The products are used for detecting a reduction in the air pressure of a tire $W_i$, thereby to calculate a judgement value D. When D satisfies the conditions:

$$D < -D_{TH1} \text{ or } D > D_{TH2}$$

it is judged that there is a tire $W_i$ with reduced air pressure. Such processing eliminates the influence of speed variations or forward/backward acceleration, such that the rotational angular speeds of the front and rear tires can be obtained more accurately. It is therefore possible to detect a reduction in air pressure with high precision regardless of vehicle speed or forward/backward acceleration.

11 Claims, 14 Drawing Sheets

REDUCED PRESSURE

NORMAL INNER PRESSURE

REDUCED PRESSURE

NORMAL INNER PRESSURE

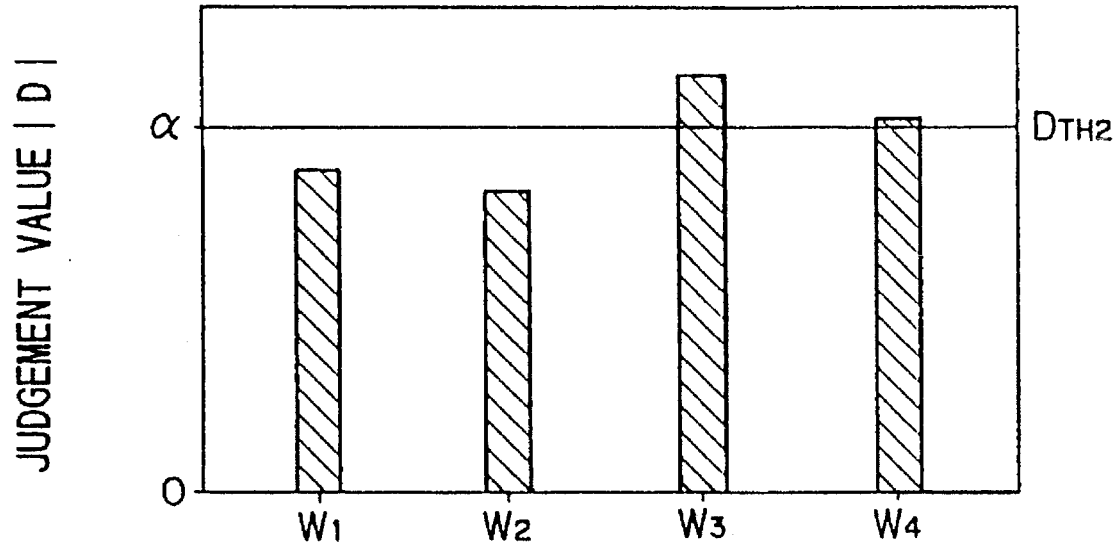
F I G. 15

TIRE AIR PRESSURE REDUCTION DETECTING METHOD AND APPARATUS

BACKGROUND OF THE INVENTION

The present invention relates to a method of and an apparatus for detecting a reduction in the air pressure of each of the tires of a four-wheeled vehicle, and more particularly to a tire air-pressure reduction detecting method capable of securely detecting a reduction in air pressure even though the vehicle is under travelling, and also to a tire air-pressure reduction detecting apparatus using this method.

As one of safety devices for a four-wheeled vehicle such as a passenger car, a truck or the like, an apparatus for detecting a reduction in the air pressure of a tire has recently been invented and partially put in practical use.

The tire air-pressure reduction detecting apparatus has been developed with its importance recognized mainly for the following reasons. If a tire is low in air pressure, the tire is increased in flexure which can raise the tire temperature. When the tire temperature is raised, a polymeric material used for the tire is lowered in strength. This may provoke tire bursting. However, even though a tire is reduced in air pressure, the driver is not aware of such a reduction.

In such a detecting apparatus, there may be used, for example, a method of detecting a reduction in air pressure based on differences among the rotational angular speeds $F_1$, $F_2$, $F_3$, $F_4$ (hereinafter collectively referred to as "rotational angular speeds $F_i$") of the four tires $W_1$, $W_2$, $W_3$, $W_4$ (in which the tires $W_1$, $W_2$ respectively correspond to the front left and right wheels, while the tires $W_3$, $W_4$ respectively correspond to the rear left and right wheels, and which are hereinafter collectively referred to as "tires $W_i$").

According to this method, the rotational angular speeds $F_i$ of the tires $W_i$ are detected per predetermined sampling period based on signals supplied from wheel speed sensors attached to the tires $W_i$ for example. When the dynamic load radii of the tires $W_i$ (the apparent rolling radii of the tires as calculated by dividing, by $2\pi$, the distances that the vehicle advances during one rotation of the tires when the vehicle travels) are the same as one another, the rotational angular speeds $F_i$ are the same as one another as far as the vehicle linearly travels.

On the other hand, the dynamic load radius of a tire $W_i$ varies with, for example, a change in the air pressure of the tire $W_i$. The dynamic load radius of a tire $W_i$ reduced in air pressure becomes smaller than that of a tire normal in inner pressure. Accordingly, the rotational angular speed $F_i$ of this tire $W_i$ is faster than that of a tire normal in inner pressure. It is therefore possible to detect a reduction in the air pressure of any of the tires $W_i$ based on differences in rotational angular speed $F_i$. The following equation (1) shows a judging formula for detecting a reduction in the air pressure of any of the tires $W_i$ (See British Patent Publication No. GB-8711310 (A) and British Patent Publication No. GB-902925 (A)):

$$D = \frac{\frac{F_1 + F_4}{2} - \frac{F_2 + F_3}{2}}{\frac{F_1 + F_2 + F_3 + F_4}{4}} \times 100 \, (\%) \tag{1}$$

For example, when the dynamic load radii of the tires $W_i$ are supposed to be the same as one another, the rotational angular speeds $F_i$ are the same as one another ($F_1=F_2=F_3=F_4$) and the judgement value D becomes 0. Here, there are determined threshold values $D_{TH1}$, $D_{TH2}$ (each of $D_{TH1}$, $D_{TH2}$ is greater than 0). When D satisfies the following judging formula:

$$D < -D_{TH1} \text{ or } D > D_{TH2} \tag{2}$$

it is judged that there is a tire $W_i$ reduced in air pressure. When D does not satisfy the judging formula, it is judged that there is no tire $W_i$ reduced in air pressure.

On the other hand, even though the tires $W_1$ to $W_4$ are normal in inner pressure, the dynamic load radii are not always the same as one another. That is, the tires $W_i$ are produced as always containing variations (hereinafter referred to as "initial differences") within the standards. It is known that the degree of such variations is about 0.1% in terms of standard deviation. For example, when a tire $W_i$ is reduced in air pressure by 0.6 kg/cm$^2$ (reduction by 30% when the normal inner pressure is 2.0 kg/cm$^2$), the variation of the dynamic load radius is about 0.2% of the normal inner pressure. The variation of a dynamic load radius due to initial difference is substantially the same as the variation of the dynamic load radius due to a reduction in air pressure. Accordingly, a difference in rotational angular speed $F_i$ due to initial difference is substantially the same as a difference in rotational angular speed $F_i$ due to reduction in air pressure. Accordingly, there are instances where the inner pressures are normal even though the judgement value D is not 0. It is therefore not possible to securely detect a reduction in air pressure only by a method of using the judgement value D on the basis of 0.

Further, when a tire is replaced or air is replenished thereinto, there is generated a change which can be regarded as an error corresponding to the initial difference. In such a case, too, a reduction in air pressure cannot be detected accurately.

To solve the problem above-mentioned, it is required, before detecting a reduction in air pressure, to previously execute a processing of obtaining coefficients for correcting the initial differences (hereinafter referred to as "the initial correction processing"). The initial correction processing is for example discussed in Japanese Patent Application No. 4-246848 (Japanese Laid-Open Patent Application No. 6-92114/1994; laid open to the public on Apr. 5, 1994) which the applicant of the present application has previously filed. According to this processing, the vehicle is linearly travelled at a predetermined speed when it is known that all the tires $W_1$ to $W_4$ are normal in inner pressure, the rotational angular speeds $F_i$ are calculated during this travelling, and there are obtained correction coefficients $C_{ni}$ based on a certain tire $W_i$. For example, when the tire $W_1$ is used as a basis, the correction coefficients $C_{ni}$ are obtained according to the following equations:

$$C_{n1} = F_1/F_1 \tag{3}$$

$$C_{n2} = F_1/F_2 \tag{4}$$

$$C_{n3} = F_1/F_3 \tag{5}$$

$$C_{n4} = F_1/F_4 \tag{6}$$

These correction coefficients $C_{ni}$ are stored in a nonvolatile memory. When the correction coefficients $C_{ni}$ are respectively multiplied by rotational angular speeds $F_i$ calculated at the time the vehicle actually travels later, the initial differences of the tires $W_i$ can be corrected.

However, the tire air-pressure reduction detecting method above-mentioned presents the following problems (A) to (C).

(A) As shown by the equations (5), (6), each of the correction coefficients $C_{n3}$, $C_{n4}$ for the tires $W_3$, $W_4$ is obtained from the ratio of the rotational angular speed $F_i$ of the front tire to the rotational angular speed $F_i$ of the rear tire. For a two wheel drive vehicle (2WD) for example, such a correction coefficient $C_{ni}$ is obtained from the ratio between the rotational angular speed of a non-driving tire and the rotational angular speed of a driving tire (hereinafter referred to as "the front/rear wheel ratio"). When the equations (5), (6) are taken as examples, the front/rear wheel ratio is equivalent to the ratio of the rotational angular speed of a driving tire to the rotational angular speed of a non-driving tire when the vehicle is of the front-wheel drive type (FWD), and the front/rear wheel ratio is equivalent to the ratio of the rotational angular speed of a non-driving tire to the rotational angular speed of a driving tire when the vehicle is of the rear-wheel drive type (RWD).

On the other hand, the calculated rotational angular speeds $F_i$ naturally vary with the vehicle speed. However, such variations are different between the driving tires to which torque is applied, and the non-driving tires to which no torque is applied. That is, torque is applied to the driving tires and the driving tires are accordingly liable to slip with an increase in vehicle speed or forward/backward acceleration. When the driving tires slip, the driving tires are increased in rotational angular speed, as compared with the non-driving tires. Thus, the front/rear wheel ratio varies with the speed and forward/backward acceleration.

When the vehicle is of front-wheel drive type, variations of the front/rear wheel ratio with respect to the speed are shown in FIG. 10, while variations of the front/rear wheel ratio with respect to the forward/backward acceleration are shown in FIG. 11.

In the initial correction processing, the correction coefficients $C_{ni}$ are obtained based on the rotational angular speeds $F_i$ calculated at a predetermined speed, and then stored in a nonvolatile memory. Accordingly, the correction coefficients $C_{ni}$ are always used when the vehicle actually travels. However, the correction coefficients $C_{n3}$, $C_{n4}$ correspond to the front/rear wheel ratio. Accordingly, the correction coefficients $C_{n3}$, $C_{n4}$ actually vary with the speed. Thus, when the fixed correction coefficients $C_{n3}$, $C_{n4}$ are used while the vehicle actually travels, it is not possible to execute accurate initial correction, resulting in a failure to detect a reduction in air pressure with high precision.

(B) It is known that the dynamic load radius of a tire $W_i$ is increased with an increase in vehicle speed (this is called tread lifting)(See FIG. 12). That is, a centrifugal force to be applied to a tire $W_i$ is increased with an increase in vehicle speed. However, this tread lifting presents the problem that a reduction in air pressure is readily detected when the vehicle travels at a low speed, but is detected with much difficulty when the vehicle travels at a high speed.

More specifically, a centrifugal force applied to a tire $W_i$ reduced in air pressure shown in FIG. 13(a) is small while the vehicle travels at a low speed. Accordingly, the dynamic load radius R1 is smaller than the dynamic load radius R2 of a tire $W_i$ normal in air pressure shown in FIG. 13(b). Thus, while the vehicle travels at a low speed, there is a remarkable difference in rotational angular speed $F_i$ between the tire $W_i$ reduced in air pressure and the tire $W_i$ normal in inner pressure. Accordingly, the judgement value D becomes relatively great, enabling a reduction in air pressure to be readily detected.

On the other hand, while the vehicle travels at a high speed, a great centrifugal force is applied to the tires. Accordingly, as shown in FIG. 14 (a), the dynamic load radius R1 of the tire $W_i$ reduced in air pressure shown in FIG. 13(a) becomes great substantially as much as the dynamic load radius R2 of a tire $W_i$ normal in inner pressure shown in FIG. 14(b). On the contrary, tension exerted to the tire $W_i$ normal in inner pressure shown in FIG. 14(b) is greater than that of a tire reduced in air pressure. Therefore, the tire Wi normal in inner pressure is unaffected so much by a centrifugal force, even if the vehicle travels at a high speed. As a result, the dynamic load radius R2 of the tire $W_i$ normal in inner pressure undergoes no substantial change. Accordingly, while the vehicle travels at a high speed, there is substantially no difference in rotational angular speed $F_i$ between the tire $W_i$ reduced in air pressure and the tire $W_i$ normal in inner pressure. Accordingly, the judgement value D approaches zero very much. Thus, the judgement value D does not satisfy the judging formula (2). This involves the likelihood that a reduction in air pressure cannot securely be detected. That is, while the vehicle travels at a high speed, a reduction in air pressure cannot securely be detected even though a tire is actually reduced in air pressure as done while the vehicle travels at a low speed.

(C) It is known that, due to the vehicle suspension having the tires $W_1$ to $W_4$, the characteristics of a fluid or a spring used therein, the amounts of changes in the dynamic load radii of the tires $W_1$ to $W_4$ resulting from reductions in air pressure, are different from one another dependent on the attachment positions of the tires $W_i$, even though the reduction rates are the same as one another. That is, the front-left tire and the rear-right tire are different from each other in the change amount of dynamic load radius. As a result, even though the tires $W_1$ to $W_4$ are reduced in air pressure at the same rate, there are generated differences in rotational angular speed $F_i$ among the tires $W_1$ to $W_4$. Thus, the judgement values D obtained according to the equation (1) are different from one another dependent on which tires are reduced in air pressure.

FIG. 15 shows the absolute value of judgement values D obtained at the time when the tires $W_1$ to $W_4$ are individually depressurized. In FIG. 15, when the threshold value $D_{TH2}$ used in the judging formula (2) is set to $\alpha$ (the threshold value cannot be set too small because there are instances where the judgement value D becomes a value other than 0 due to reasons other than a reduction in air pressure), a reduction in air pressure of each of the tires $W_3$, $W_4$ can be detected, but a reduction in air pressure of each of the tires $W_1$, $W_2$ cannot be detected. This presents the problem that, even though a tire $W_i$ reduced in air pressure actually exists, such a reduction may not be detected dependent on the position of the tire $W_i$. This is not preferable in view of traffic safety.

SUMMARY OF THE INVENTION

It is an object of the present invention to provide tire air-pressure reduction detecting method and apparatus capable of obtaining the rotational angular speeds more accurately.

It is another object of the present invention to provide tire air-pressure reduction detecting method and apparatus capable of securely detecting a reduction in the air pressure of a tire even though the vehicle travels at a high speed.

It is a further object of the present invention to provide tire air-pressure reduction detecting method and apparatus capable of securely detecting a reduction in the air pressure of a tire regardless of the attachment position of such a tire.

According to the present invention, there are obtained, as functions of speeds or forward/backward accelerations, the ratios of the rotational angular speeds of the driving tires to the rotational angular speeds of the non-driving tires, these rotational angular speeds being detected while the vehicle is subjected to a test running, and the relationship between the ratios thus obtained and the speeds or forward/backward accelerations is stored. In a front-wheel drive vehicle, a rear-wheel drive vehicle or a four-wheel drive vehicle, the slip ratios of the driving tires vary with changes in vehicle speed or forward/backward acceleration. As a result, the driving tires and non-driving tires are different from each other in changes in rotational angular speed due to changes in speed or forward/backward acceleration. Accordingly, the ratios above-mentioned also vary with the speed or forward/backward acceleration. In this connection, such differences in change are obtained and stored.

When the vehicle actually travels, the vehicle speed or forward/backward acceleration is calculated, and there is obtained, based on the relationship above-mentioned, the ratio corresponding to the speed or forward/backward acceleration thus calculated. Then, the rotational angular speeds are corrected based on the ratio thus obtained.

Accordingly, the rotational angular speeds of front/rear tires can be corrected more accurately with the influence of speed variation or forward/backward acceleration eliminated. It is therefore possible to detect a reduction in air pressure with high precision regardless of the vehicle speed or forward/backward acceleration.

As another aspect of the present invention, the vehicle is first subjected to a test running at each of predetermined speeds with the tires thereof individually depressurized. Here, the tires are depressurized in order to obtain a ratio, as will be discussed later, to be used for correcting a judgement value. During the test running or after the test running has been finished, judgement values for judging a reduction in air pressure are obtained according to a judging formula. Out of these obtained judgement values, the judgement value for a predetermined reference speed is set as a reference judgement value. Then, there is stored the relationship between the ratios of the other obtained judgement values to this reference judgement value and the speeds.

As to the form in which the relationship above-mentioned is stored in memory means, such a relationship may be stored in the form of an approximation formula, or the ratio of the judgement values obtained by putting the speeds in the approximation formula, may be stored, together with the speeds, in the form of a table.

When the vehicle actually travels, the vehicle speed is calculated and a judgement value is obtained based on the detected rotational angular speeds of the tires. Then, there is obtained, based on the relationship, the ratio corresponding to the calculated speed, and the judgement value is corrected based on the ratio thus obtained.

According to the arrangement above-mentioned, there may be corrected, based on the ratio for the vehicle speed, threshold values serving as references based on which it is judged whether or not a tire is reduced in air pressure.

Since the judgement value thus operated is corrected according to the speed, there can be disregarded a so-called tread lifting generated while the vehicle travels at a high speed. Accordingly, even though the vehicle travels at a high speed, a reduction in air pressure can securely be detected. This contributes to safe travelling.

As a further aspect of the present invention, the vehicle is subjected to a test running with the tires thereof individually depressurized. Here, the tires are depressurized in order to actually measure differences in judgement value among the tires when they are actually individually depressurized, thereby to obtain a ratio used for correcting the judgement value. During the test running or after the test running has been finished, there is obtained, according to a judging formula, a judgement value for judging a reduction in air pressure. On the other hand, out of the tires of the vehicle, a certain tire is set as a reference tire. There are obtained the ratios of the judgement values for other tires than the reference tire, to the judgement value for the reference tire, and these ratios are stored as respectively corresponding to the tires.

While the vehicle actually travels, there is specified, based on the detected rotational angular speeds, a tire which satisfies a predetermined specific condition relating to a reduction in air pressure. The specific condition as to a reduction in air pressure, refers to, for example, a condition of whether or not the tire has much possibility of its air pressure being reduced. There may be used any of a variety of specifying methods as will be discussed in the description of the embodiments of the present invention. When there is specified a tire with much possibility of its air pressure being reduced, there is read the ratio stored as corresponding to the tire thus specified. Then, there is corrected the judgement value based on this ratio. That is, correction is made according to each of the tires. It is therefore possible to obtain a judgement value which can sufficiently comply with a judgement of a reduction in air pressure, whichever may a 0 tire be reduced in air pressure.

According to the arrangement above-mentioned, there may be specified a tire which satisfies the specific condition relating to a reduction in air pressure, and there may be corrected, based on the ratio corresponding to the specified tire, the threshold values serving as references based on which a reduction in air pressure is judged.

As thus discussed, since there are corrected the judgement value or threshold values obtained according to a specified tire, variations of the judgement value among the tires can be restrained. Accordingly, a tire reduced in air pressure can securely be detected regardless of the attachment position of the tire. This contributes to safe travelling.

These and other features, objects and advantages of the present invention will be more fully apparent from the following detailed description set forth below when taken in conjunction with the accompanying drawings.

BRIEF DESCRIPTION OF THE DRAWINGS

FIG. 15 is a view illustrating the absolute value of the judgement values as obtained by individually depressurizing the tires of a vehicle.

DETAILED DESCRIPTION OF THE EMBODIMENTS

I. Arrangement of the Tire Air-Pressure Reduction Detecting Apparatus

Figure 1:
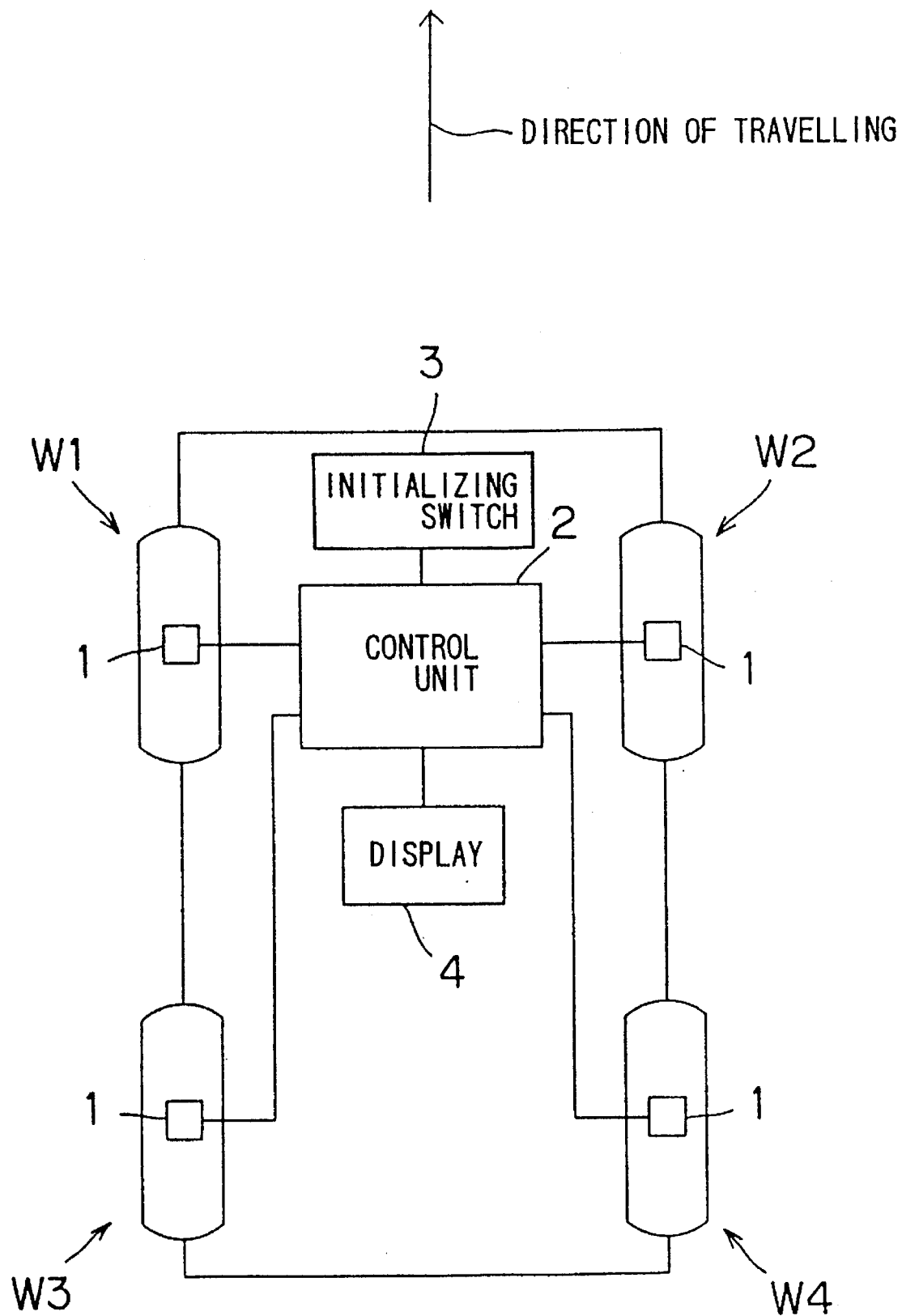
FIG. 1 is a block diagram of the arrangement of a tire air-pressure reduction detecting apparatus according to the present invention.

FIG. 1 is a block diagram illustrating the arrangement of the tire air-pressure reduction detecting apparatus. The tire air-pressure reduction detecting apparatus has conventionally known vehicle wheel speed sensors 1 respectively disposed at the tires $W_1$ to $W_4$ of a four-wheeled vehicle of the front-wheel drive type (FWD). Outputs of the vehicle wheel speed sensors 1 are to be given to a control unit 2. Connected to the control unit 2 are an initializing switch 3 to be operated by a driver, and a display (CRT or the like) 4 for displaying a tire reduced in air pressure.

Figure 2:
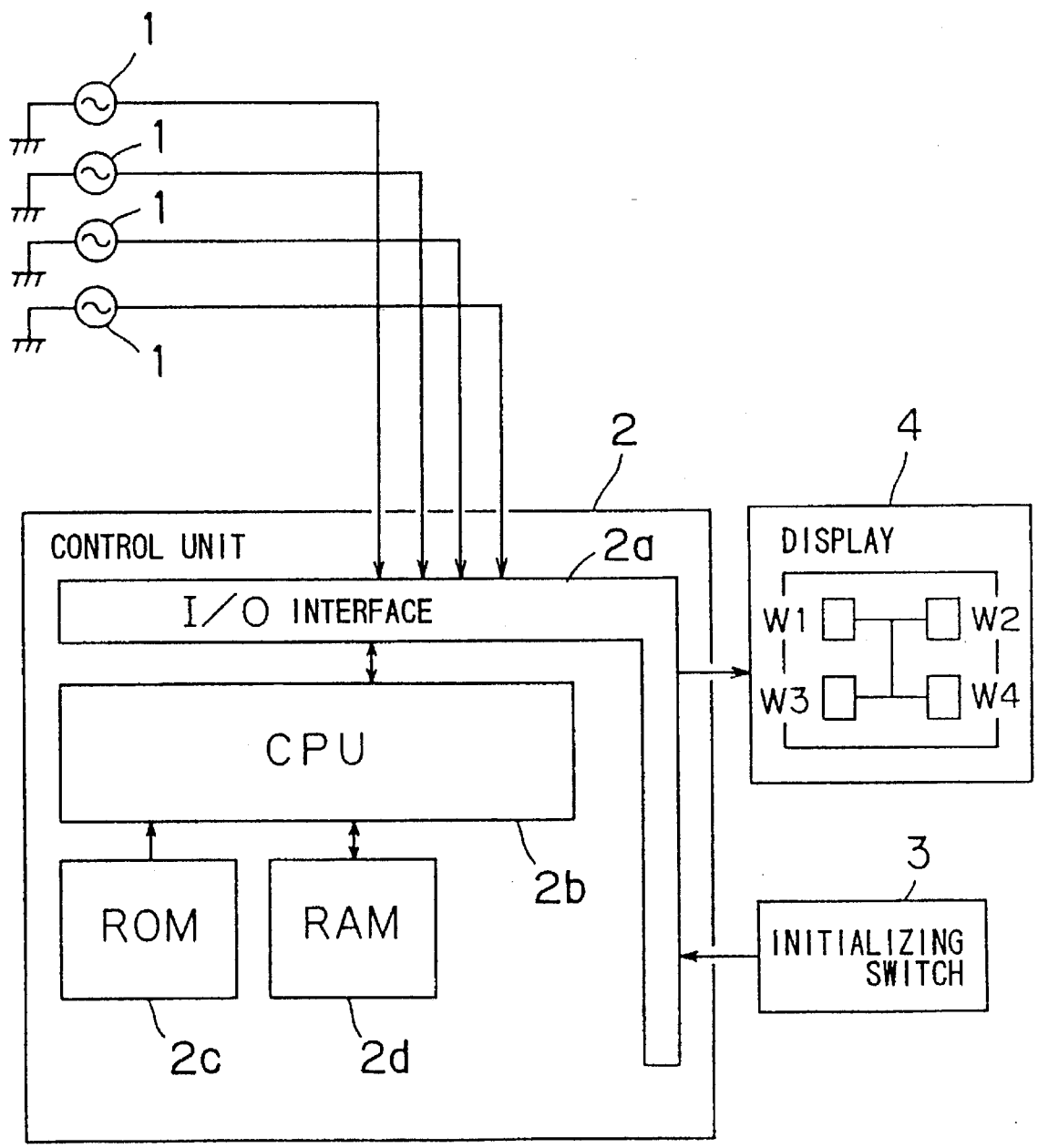
FIG. 2 is a block diagram of the electric arrangement of the tire air-pressure reduction detecting apparatus.

FIG. 2 is a block diagram of the electric arrangement of the tire air-pressure reduction detecting apparatus. The control unit 2 comprises a microcomputer including, as hardware, an I/O interface 2a for transmitting and receiving a signal to and from an external device, a CPU 2b serving as a core for operational processings, a ROM 2c containing a control operation program of the CPU 2b, and a RAM 2d into which data or the like is temporarily written when the CPU 2b carries out a control operation, or from which data or the like already written is read out when the CPU 2b carries out a control operation. The ROM 2c previously contains a formula of relationship between vehicle speed and front/rear wheel ratio, a formula of relationship between vehicle forward/backward acceleration and front/rear wheel ratio, a formula of relationship between square value of vehicle speed and average of judgement values, and correction coefficients to be used in a judgement value correction processing, a speed at the time when initial correction is executed, and the like. The RAM 2d has a tire data memory zone (hereinafter referred to as "MAX $\{F_i(I)\}$ (I=1 to n)") for specifying a tire $W_i$ with much possibility of its air pressure being reduced.

The vehicle wheel speed sensors 1 supply pulse signals (hereinafter referred to as "wheel speed pulses") corresponding to the numbers of rotations of the tires $W_i$ (i corresponds to the numerals 1, 2, 3, 4 of the tires $W_1$ to $W_4$). Based on the wheel speed pulses thus supplied, the CPU 2b calculates the rotational angular speeds $F_i$ of the tires $W_i$ per predetermined sampling period $\Delta T$.

II. Initial Correction Processing

As discussed in the column "BACKGROUND OF THE INVENTION", there is a possibility of the rotational angular speeds $F_i$ having been influenced by the initial differences of the tires $W_i$. It is therefore required to correct such initial differences. Before the tire air-pressure reduction detecting apparatus is forwarded from the factory, or when a tire is replaced with a new tire or air is replenished thereinto, such an initial correction processing is to be executed while travelling the vehicle at a predetermined speed $V_0$ (for example, 60 Km/h). The initial correction processing is started by operating the initializing switch 3 (See FIG. 1) by the driver.

Figure 3:
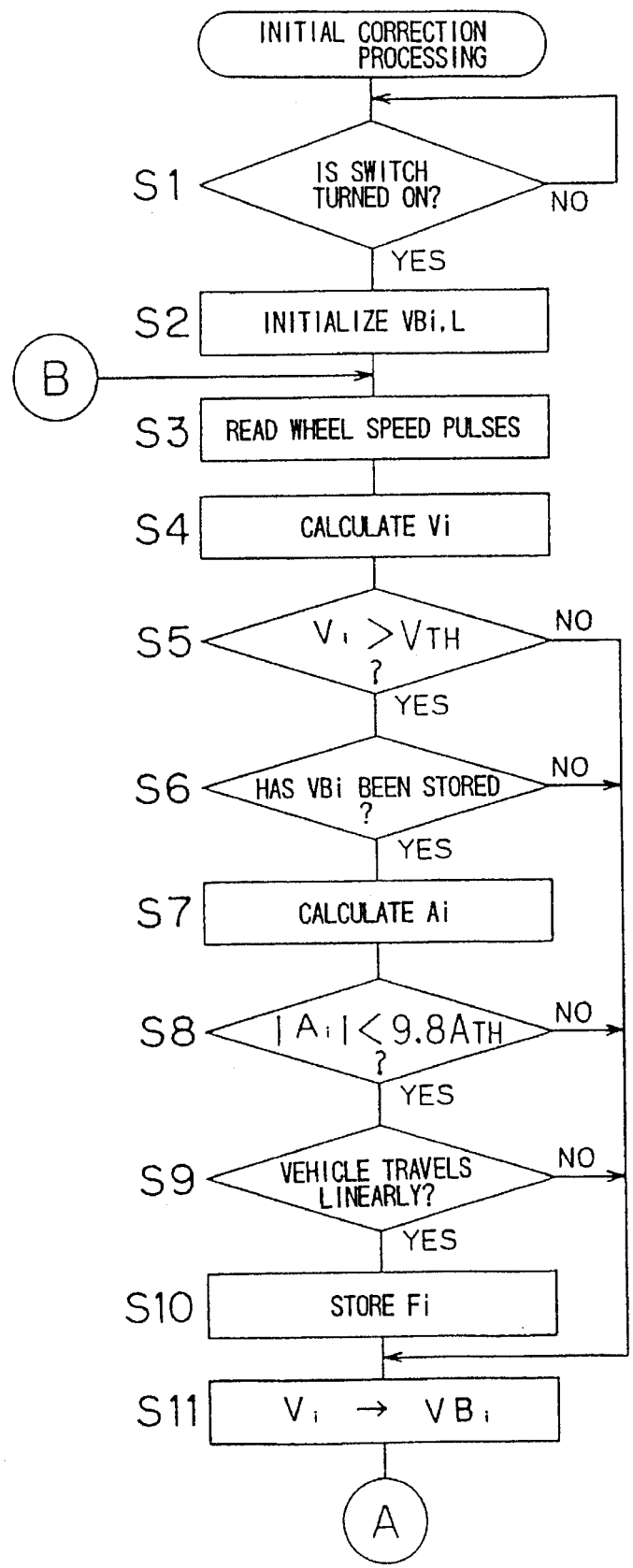
FIG. 3 is a flow chart illustrating an initial correction processing in the tire air-pressure reduction detecting apparatus.
Figure 4:
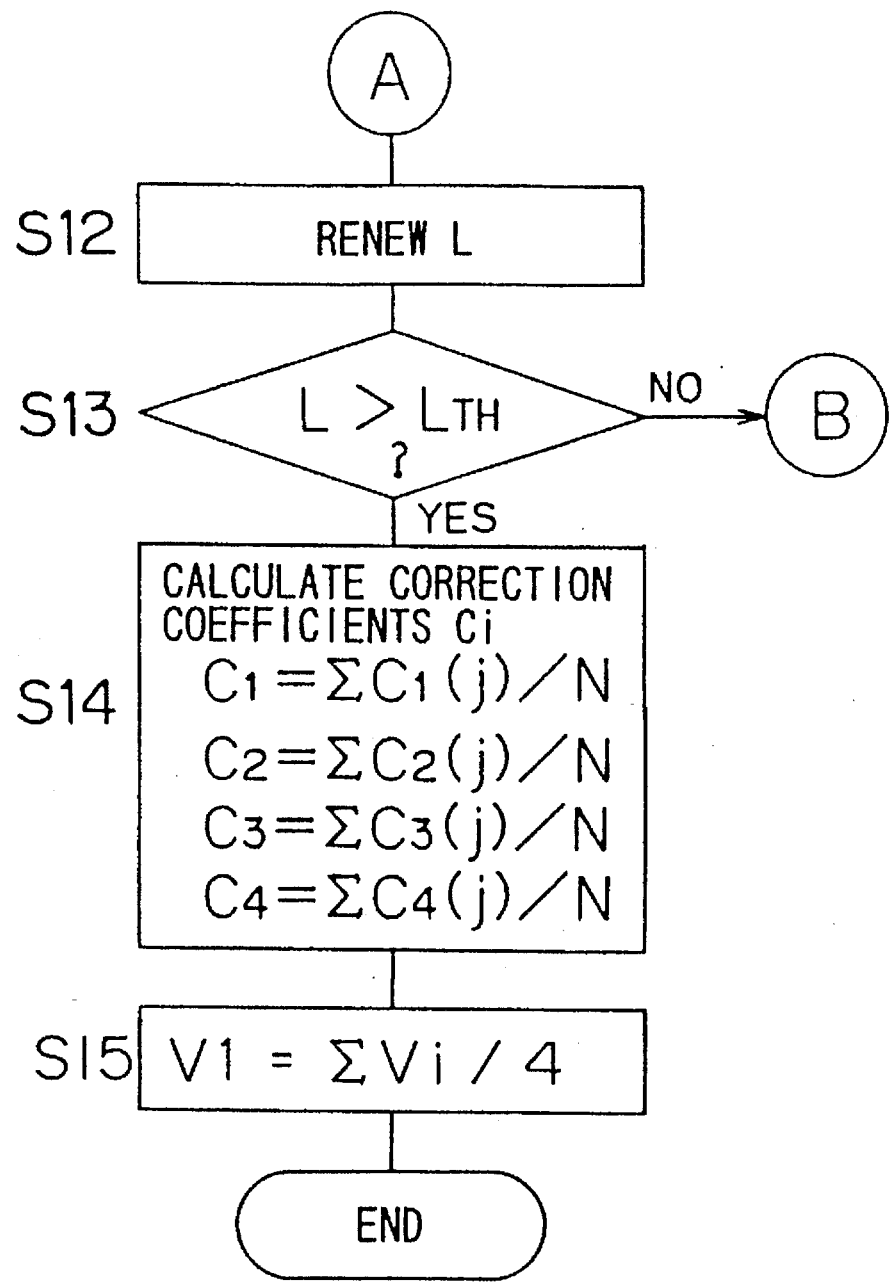
FIG. 4 is a flow chart illustrating an initial correction processing similar to that shown in FIG. 3.

The following description will discuss the initial correction processing with reference to its flow chart shown in FIGS. 3 and 4.

When the initializing switch 3 is turned on (Step S1), a speed $VB_i$ and a travelling distance L stored in the RAM 2d are reset (initialized) by the CPU 2b (Step S2). The speed $VB_i$ is used for calculating forward/backward acceleration $A_i$ to be discussed later. Then, wheel speed pulses or outputs of the vehicle wheel speed sensors 1 are read (Step S3), and there are obtained, based on the wheel speed pulses, rotational angular speeds $F_i$. Then, according to the equation of $V_i = R \times F_i$ (R is the radius of each of the tires $W_i$), there are calculated speeds $V_i$ of the tires $W_i$ (step S4). Then, the speeds $V_i$ thus calculated are compared with a predetermined threshold value $V_{TH}$ (for example, 10 km/h) (Step S5).

When there exists any speed $V_i$ smaller than the threshold value $V_{TH}$, the speed $V_i$ is stored, as $VB_i$, in the RAM 2d (Step S11). On the other hand, when all the speeds $V_i$ are greater than the threshold value $V_{TH}$, it is then judged whether or not $VB_i$ has already been stored in the RAM 2d (Step S6). When $VB_i$ has not been stored or is still in the initialized state, each of the speeds $V_i$ is stored as $VB_i$ in the RAM 2d (Step S11). On the other hand, when $VB_i$ has already been stored, the forward/backward acceleration $A_i$ of each of the tires $W_i$ is calculated according to the equation of $A_i = (V_i - VB_i)/\Delta T$ (where $\Delta T$ refers to a sampling period) (Step S7).

When the forward/backward accelerations $A_i$ of the tires $W_i$ are calculated, it is then judged according to the following formula whether or not the absolute value of each of the forward/backward accelerations $A_i$ is smaller than a predetermined threshold value $A_{TH}$ (for example 0.01) (Step S8):

$$\left| \frac{V_i - VB_i}{\Delta T} \right| < A_{TH} \times 9.8 \tag{7}$$

When it is judged that even one of the calculated forward/backward accelerations $A_i$ is greater than the threshold value $A_{TH}$, it is regarded that the tire has slipped, and each of the speeds $V_i$ is stored, as $VB_i$, in the RAM 2d (Step S11). On the other hand, when all the calculated forward/backward accelerations $A_i$ are smaller than the threshold value $A_{TH}$, it is then judged whether or not the vehicle travels linearly (Step S9).

When it is judged that the vehicle does not travel linearly, each of the speeds $V_i$ is stored, as $VB_i$, in the RAM 2d. On the other hand, when it is judged that the vehicle travels linearly, the rotational angular speeds $F_i$ are stored in the RAM 2d (Step S10), and each of the speeds $V_i$ is stored, as $VB_i$, in the RAM 2d (Step S11).

When the processing of Step S11 is finished, the travelling distance L stored in the RAM $2d$ is renewed by a distance that the vehicle has travelled during the sampling period $\Delta T$ (FIG. 4; Step S12). Then, it is judged whether or not the renewed travelling distance L is greater than a predetermined threshold value $L_{TH}$ (for example 200 m) (Step S13). As a result, when the renewed travelling distance L is shorter than the threshold value $L_{TH}$, the processings on and after Step S3 are repeatedly carried out again. On the other hand, when the travelling distance L reaches the threshold value $L_{TH}$, correction coefficients $C_i(j)$ are calculated based on the rotational angular speeds $F_i$ stored in the RAM $2d$ (Step S14).

The correction coefficients $C_i(j)$ are obtained on the basis of a certain tire $W_i$. For example, when the tire $W_1$ is used as a basis, the correction coefficients $C_1(j), C_2(j), C_3(j), C_4(j)$ are calculated as follows;

$$C_1(j)=F_1(j)/F_1(j) \tag{8}$$

$$C_2(j)=F_1(j)/F_2(j) \tag{9}$$

$$C_3(j)=F_1(j)/F_3(j) \tag{10}$$

$$C_4(j)=F_1(j)/F_4(j) \tag{11}$$

where j=1 to N, and N is the number of the rotational angular speeds $F_i$ stored in the RAM $2d$. Thus, there are calculated N correction coefficients $C_1(j)$, N correction coefficients $C_2(j)$, N correction coefficients $C_3(j)$, and N correction coefficients $C_4(j)$.

To improve the correction coefficients $C_i(j)$, the averages of N correction coefficients $C_1(j), C_2(j), C_3(j), C_4(j)$ are calculated as follows;

$$C_1=\Sigma C_1(j)/N \tag{12}$$

$$C_2=\Sigma C_2(j)/N \tag{13}$$

$$C_3=\Sigma C_3(j)/N \tag{14}$$

$$C_4=\Sigma C_4(j)/N \tag{15}$$

where $\Sigma$ means the sum total of the correction coefficients $C_i(j)$ wherein J=1 to N. The averages $C_1, C_2, C_3, C_4$ thus calculated are used as the final correction coefficients.

Upon completion of the calculation of these correction coefficients $C_i$, the average of the speed $V_i$ stored finally is stored as the speed $V_1$ at the time when the initial correction is executed (Step S15). When the process of storing has been finished, the initial correction processing is finished.

III. First Embodiment

The following description will discuss how to obtain a formula of relationship between vehicle speed and front/rear wheel ratio, and a formula of relationship between forward/backward acceleration and front/rear wheel ratio. Before the tire air-pressure reduction detecting apparatus is forwarded from the factory, these formulas of relationship are obtained and stored in the ROM $2c$ as mentioned earlier.

When the initial correction processing is finished, the formula of relationship between speed and front/rear wheel ratio is then to be obtained. First, the vehicle is linearly travelled at a constant speed. At this time, it is supposed that the air pressures of the tires $W_1$ to $W_4$ are normal. While the vehicle is travelled, the vehicle wheel speed sensors 1 attached to the tires $W_i$ supply wheel speed pulses and the CPU $2b$ calculates the rotational angular speeds $F_i$ of the tires $W_i$ every sampling period $\Delta T$.

Here, the rotational angular speeds $F_i$ thus calculated are those which have not been subjected yet to correction of initial differences. Accordingly, using the correction coefficients $C_i$ obtained at the initial correction processing, the rotational angular speeds $F_i$ are corrected to rotational angular speeds $F_{i0}$ as follows:

$$F_{10}=C_1 \times F_1 \tag{16}$$

$$F_{20}=C_2 \times F_2 \tag{17}$$

$$F_{30}=C_3 \times F_3 \tag{18}$$

$$F_{40}=C_4 \times F_4 \tag{19}$$

As to the rotational angular speeds $F_{i0}$ thus corrected, there are obtained the ratios $\alpha, \beta, \gamma, \delta$ of the rotational angular speeds of the driving tires, i.e., the rotational angular speeds $F_{10}, F_{20}$ of the tires $W_1, W_2$ in this embodiment, to the rotational angular speeds of the non-driving tires, i.e., the rotational angular speeds $F_{30}, F_{40}$ of the tires $W_3, W_4$ in this embodiment:

$$\alpha=F_{10}/F_{30} \tag{20}$$

$$\beta=F_{10}/F_{40} \tag{21}$$

$$\gamma=F_{20}/F_{30} \tag{22}$$

$$\delta=F_{20}/F_{40} \tag{23}$$

Then, the average of $\alpha, \beta, \gamma, \delta$, is calculated, and the value thus calculated is used as a front/rear wheel ratio Z $(=(\alpha+\beta+\gamma+\delta)/4)$.

The operations above-mentioned are carried out for each of the speeds, and the front/rear wheel ratio Z is obtained for each of the speeds. The front/rear wheel ratio Z at a certain speed (for example, 20 km/h) serving as a reference speed, is defined as 1, and the front/rear wheel ratios Z thus obtained are drawn in the form of a graph for each of speeds. Such a graph is upwardly inclined in the right direction as shown, for example, in FIG. 10 (as referred to in "BACKGROUND OF THE INVENTION"). When the graph thus obtained is approximated by a method of least squares, there can be obtained a formula of relationship f(V) between speed and front/rear wheel ratio Z.

The formula of relationship between forward/backward acceleration and front/rear wheel ratio is then obtained subsequently after the formula of relationship f(V) between speed and front/rear wheel ratio Z has been obtained. First, the vehicle is linearly travelled with a certain forward/backward acceleration. At this time, the rotational angular speeds $F_i$ calculated by the CPU $2b$ have already been corrected by the correction coefficients $C_i$. Based on the corrected rotational angular speeds $F_{i0}$, the speed $V_0$ of the vehicle is then calculated. The speed $V_0$ thus calculated is put in the obtained formula of relationship f(V), and the front/rear wheel ratio $f(V_0)$ corresponding to the speed $V_0$ is obtained. Simultaneously, there is obtained the front/rear wheel ratio $f(V_1)$ corresponding to the speed $V_1$ (for example, 60 km/h) at which the initial correction processing has been executed.

Based on the obtained front/rear wheel ratios $f(V_1), f(V_0)$, there can then be obtained a variation $f(V_0)/f(V_1)$ of the front/rear wheel ratio Z from the speed $V_0$ to the speed $V_1$. Then, using the variation $f(V_0)/f(V_1)$, the detected rotational angular speeds $F_{30}, F_{40}$ of the non-driving tires $W_3, W_4$ are corrected according to the following equations (24), (25):

$$F_{30'} = F_{30} \times \{f(V_0)/f(V_1)\} \tag{24}$$

$$F_{40'} = F_{40} \times \{f(V_0)/f(V_1)\} \tag{25}$$

By this correction, there can be obtained rotational angular speeds $F_{30'}$, $F_{40'}$ with any influence of speed variations eliminated.

A forward/backward acceleration $A_1$ at this point of time, can be obtained based on the calculated speed $V_0$ and a speed $V_2$ calculated at the point of time earlier by one sampling period $\Delta T$ from the point of time when the speed $V_0$ has been calculated:

$$A_1 = (V_0 - V_2)/\Delta T \times 9.8 \tag{26}$$

It is noted that the forward/backward acceleration $A_1$ may be obtained from an acceleration (G) sensor for example.

Then, there are obtained the ratios $\alpha'$, $\beta'$, $\gamma'$, $\delta'$ between the corrected values $F_{30'}$, $F_{40'}$ and the rotational angular speeds $F_{10}$, $F_{20}$ of the driving tires $W_1$, $W_2$:

$$\alpha' = F_{10}/F_{30'} \tag{27}$$

$$\beta' = F_{10}/F_{40'} \tag{28}$$

$$\gamma' = F_{20}/F_{30'} \tag{29}$$

$$\delta' = F_{20}/F_{40'} \tag{30}$$

Then, the average of $\alpha'$, $\beta'$, $\gamma'$, $\delta'$ is calculated, and the value thus calculated is used as a front/rear wheel ratio Z ($=\alpha' + \beta' + \gamma' + \delta'/4$).

Figure 11:
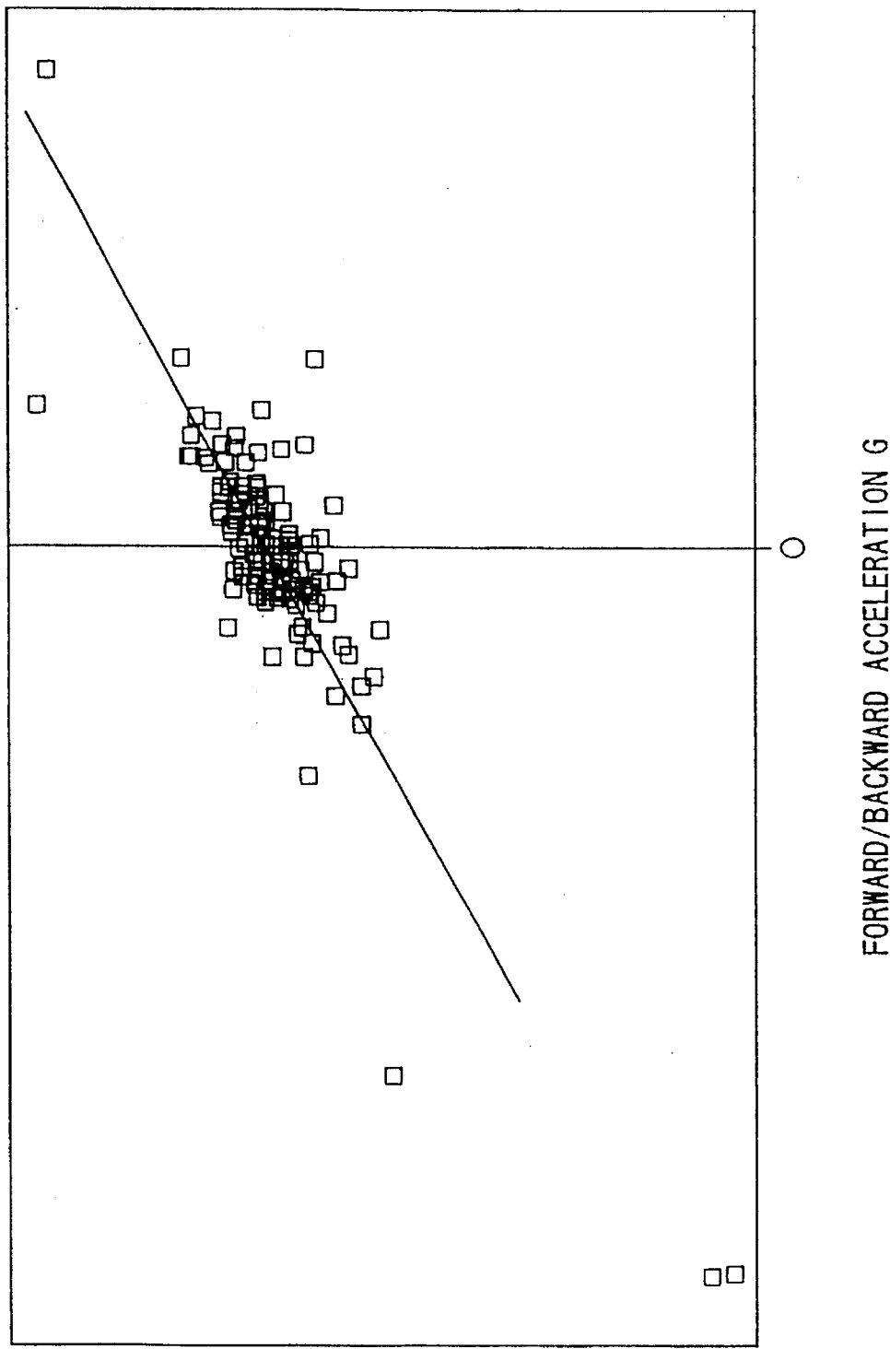
FIG. 11 is a graph illustrating variations of the front/rear wheel ratio with respect to the forward/backward acceleration in the tire air-pressure reduction detecting apparatus.
Figure 12:
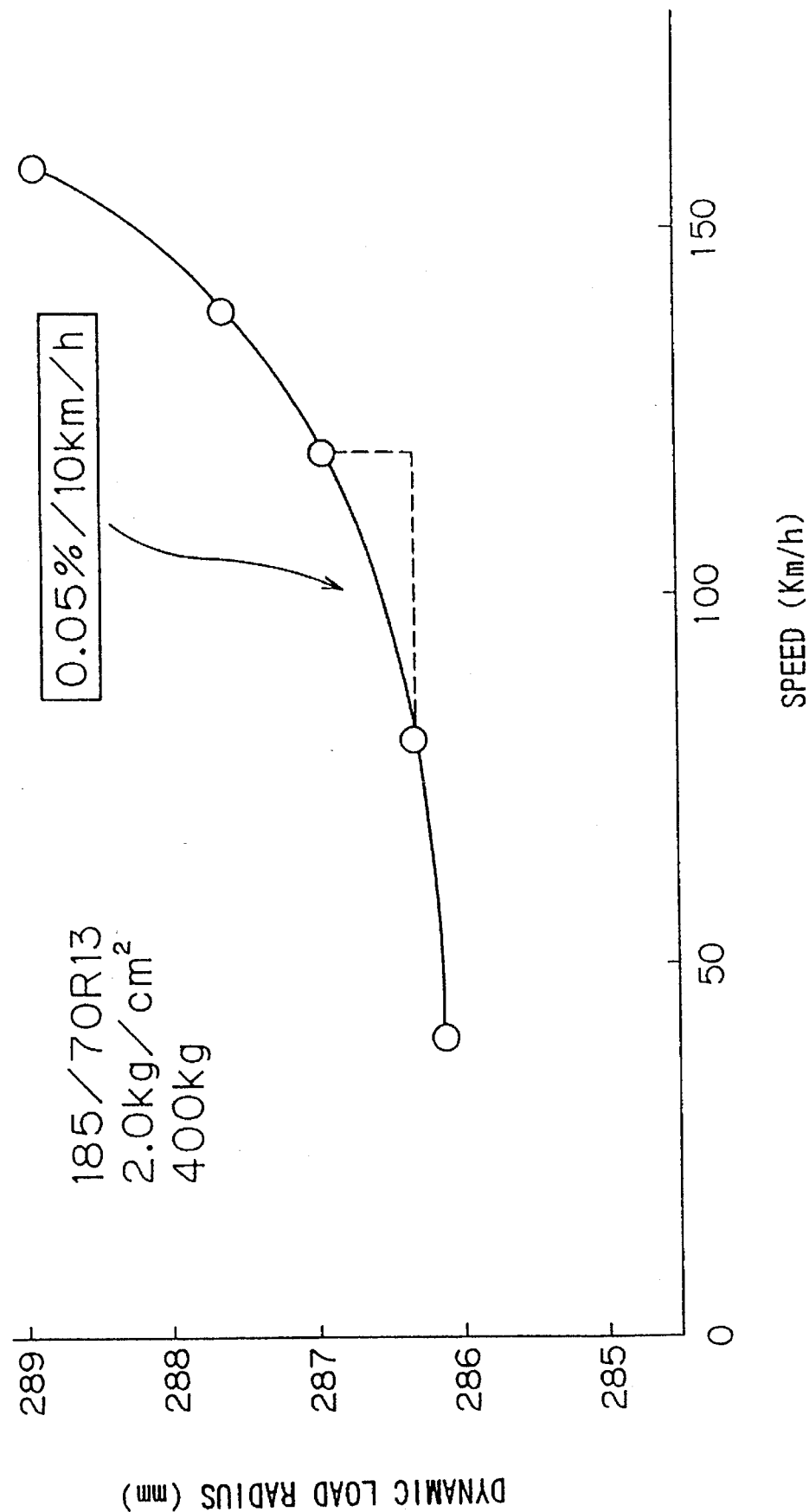
FIG. 12 is a graph illustrating variations of the dynamic load radius with respect to variations of the speed.
Figure 13A:
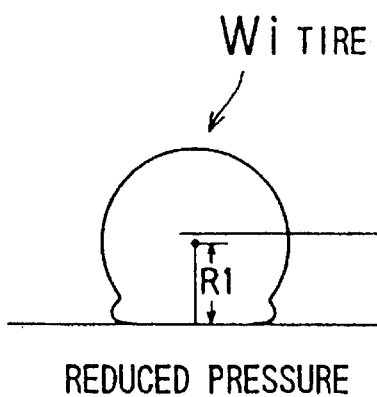
FIG. 13 is a view illustrating a difference in dynamic load radius between a tire reduced in air pressure and a tire normal in air pressure of a vehicle under travelling at a low speed.
Figure 13B:
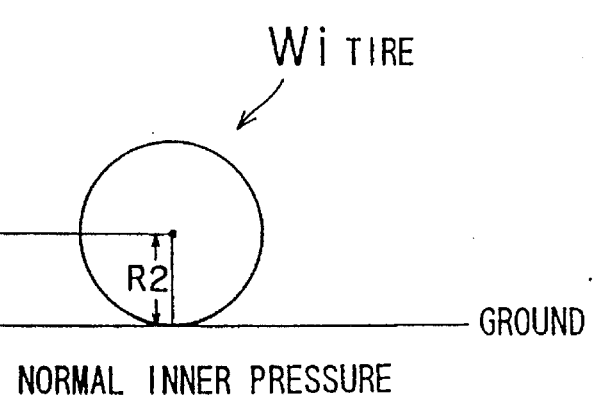
Figure 14A:
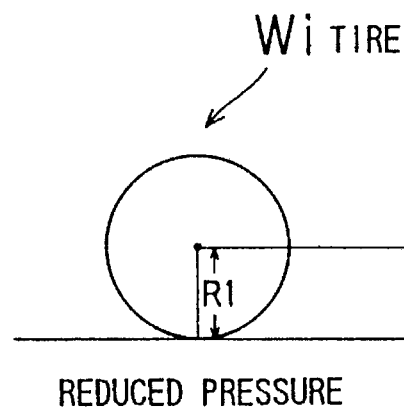
FIG. 14 is a view illustrating a difference in dynamic load radius between a tire reduced in air pressure and a tire normal in air pressure of a vehicle under travelling at a high speed.
Figure 14B:
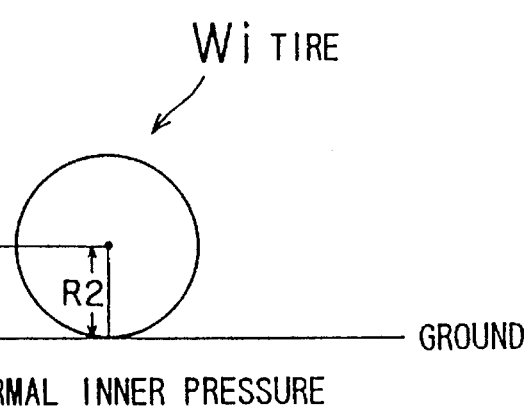

The operations above-mentioned are carried out for each of a variety of forward/backward accelerations, and the front/rear wheel ratios Z are obtained for such forward/backward accelerations. When the relationship between the forward/backward accelerations and the front/rear wheel ratios Z is drawn in the form of a line graph, such a line graph is upwardly inclined in the right direction as shown, for example, in FIG. 11 (as referred to in "BACKGROUND OF THE INVENTION") in which the front/rear wheel ratio Z is equal to 1 when the forward/backward acceleration is equal to 0. When the graph thus obtained is approximated by a method of least squares, there can be obtained a formula of relationship f(A) between forward/backward acceleration and front/rear wheel ratio Z.

When the formula of relationship f(A) have been obtained, the formula of relationship f(V) and the formula of relationship f(A) are stored in the ROM 2c.

The following description will discuss a processing to be executed when the vehicle usually travels. During such a usual travelling, there are instances where a tire is replaced or air is replenished into a tire. In this case, there is a likelihood that the correction coefficients $C_i$ obtained before the apparatus is forwarded from the factory, undergo a change. Accordingly, if a tire is replaced or air is replenished into a tire, the correction coefficients $C_i$ are to be newly obtained by executing again the initial correction processing above-mentioned.

When the vehicle usually travels, a processing of correcting initial differences is executed using the correction coefficients $C_i$ obtained by the initial correction processing. Thus, there are obtained rotational angular speeds $F_{i0}$. Based on the rotational angular speeds $F_{i0}$, there is calculated a speed $V_0$ of the vehicle from the equation of $V_0 = (F_{10} + F_{20} + F_{30} + F_{40}) \times R/4$ (where R is the dynamic load radius of the tires $W_i$). The speed $V_0$ thus calculated is put in the formula of relationship f(V) stored in the ROM 2c. Thus, there can be obtained a front/rear wheel ratio $f(V_0)$ for the speed $V_0$. It is noted that the speed $V_0$ may be obtained with the use of a signal supplied from, for example, a speed meter previously attached to the vehicle, instead of a method based on the rotational angular speeds $F_{i0}$ above-mentioned.

On the other hand, the speed $V_1$ at which the initial correction processing has been executed (60 km/h in this embodiment), is put in the formula of relationship f(V) stored in the ROM 2c. As a result, there can be obtained a front/rear wheel ratio $f(V_1)$ for the speed $V_1$. Instead of a method of obtaining a front/rear wheel ratio by putting a speed in the formula of relationship f(V), there may be employed a method in which, before the tire air-pressure reduction detecting apparatus is forwarded from the factory, front/rear wheel ratios for typical speeds (for example, 50 km/h, 60 km/h, 100 km/h) are obtained and stored in the ROM 2c and in which a front/rear wheel ratio for the speed at which the initial correction processing has been executed, is read from the ROM 2c if such a front/rear wheel ratio is stored therein.

When there are used the front/rear wheel ratios $f(V_0)$, $f(V_1)$ thus obtained, there can be obtained a variation $f(V_0)/f(V_1)$ of the front/rear wheel ratio Z from the speed $V_0$ to the speed $V_1$. Then, using the variation $f(V_0)/f(V_1)$, the rotational angular speeds $F_{30}$, $F_{40}$ of the non-driving tires $W_3$, $W_4$ obtained while the vehicle is travelling, are corrected according to the following equations (31), (32):

$$F_{30'} = F_{30} \times \{f(V_0)/f(V_1)\} \tag{31}$$

$$F_{40'} = F_{40} \times \{f(V_0)/f(V_1)\} \tag{32}$$

By this correction, there can be obtained rotational angular speeds $F_{30'}$, $F_{40'}$ with any influence of speed variations eliminated.

Then, a forward/backward acceleration $A_1$ is calculated according to the equation (26).

Then, the forward/backward acceleration $A_1$ thus calculated is put in the formula of relationship f(A) stored in the ROM 2c. As a result, there can be obtained a front/rear wheel ratio $f(A_1)$ for the forward/backward acceleration $A_1$. Then, using the front/rear wheel ratio $f(A_1)$ thus obtained, the rotational angular speeds $F_{30'}$, $F_{40'}$ free from any influence of speed variations, are corrected according to the following equations (33), (34):

$$F_{30''} = F_{30'} \times f(A_1) \tag{33}$$

$$F_{40''} = F_{40'} \times f(A_1) \tag{34}$$

By this correction, there can be obtained rotational angular speeds $F_{30''}$, $F_{40''}$ free from any influence of variations of the forward/backward acceleration.

Figure 5:
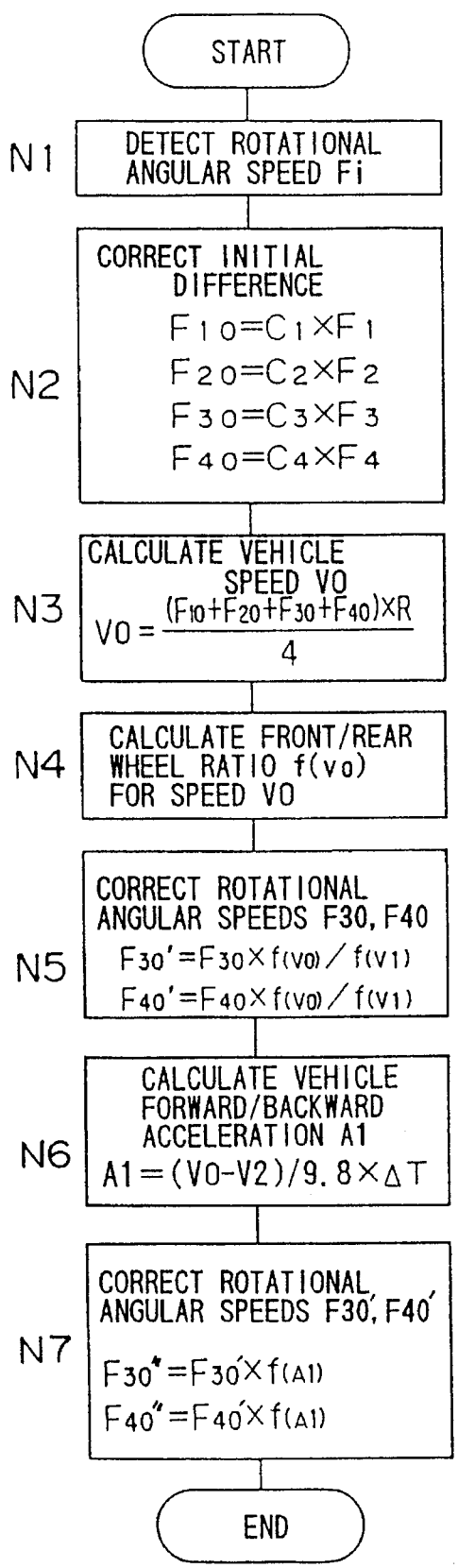
FIG. 5 is a flow chart illustrating a rotational angular speed correction processing in the tire air-pressure reduction detecting apparatus.

The following description will be made with reference to FIG. 5 showing a flow chart collectively illustrating the operations above-mentioned to be carried out when the vehicle actually travels. When the vehicle actually travels, the rotational angular speeds $F_i$ of the tires $W_i$ are detected (Step N1). The rotational angular speeds $F_i$ are multiplied by the correction coefficients $C_i$ to correct the initial differences (Step N2). Based on the rotational angular speeds $F_{i0}$ thus obtained, the vehicle speed $V_0$ is calculated (Step N3). The vehicle speed $V_0$ is put in the formula of relationship f(V) stored in the ROM 2c, thereby to obtain a front/rear wheel ratio $f(V_0)$ for the speed $V_0$ (Step N4). Based on the front/rear wheel ratio $f(V_0)$ and the front/rear wheel ratio $f(V_1)$ for the speed $V_1$ at which the correction coefficient $C_i$ have been obtained, there is obtained a variation $f(V_0)/f(V_1)$ of the front/rear wheel ratio, and the rotational angular speeds $F_{30}$, $F_{40}$ are multiplied by the variation $f(V_0)/f(V_1)$ (Step N5). Thus, the rotational angular speeds $F_{30'}$, $F_{40'}$ can be corrected according to the speed.

Then, based on the vehicle speed $V_0$ and a vehicle speed $V_2$ calculated at the point of time earlier by one sampling period $\Delta T$ from the point of time when the speed $V_0$ has been calculated, a vehicle forward/backward acceleration $A_1$ is calculated (Step N6). This vehicle forward/backward acceleration $A_1$ is put in the formula of relationship $f(A)$ stored in the ROM $2c$, thereby to obtain a front/rear wheel ratio $f(A_1)$ for the forward/backward acceleration $A_1$. The rotational angular speeds $F_{30'}$, $F_{40'}$ corrected according to the speed, are multiplied by the front/rear wheel ratio $f(A_1)$ (Step N7). Thus, the rotational angular speeds $F_{30'}$, $F_{40'}$ corrected according to the speed, can further be corrected according to the front/rear acceleration.

In this embodiment, an air-pressure judgement is to be made using the rotational angular speeds $F_{10}$, $F_{20}$, $F_{30''}$, $F_{40''}$ including these corrected rotational angular speeds $F_{30''}$, $F_{40''}$. First, using the rotational angular speeds $F_{10}$, $F_{20}$, $F_{30''}$, $F_{40''}$, a judgement value D is obtained according to the following equation (35):

$$D = \frac{\frac{F_{10}+F_{40}''}{2} - \frac{F_{20}+F_{30}''}{2}}{\frac{F_{10}+F_{20}+F_{30}''+F_{40}''}{4}} \times 100\ (\%) \quad (35)$$

Then, using the judgment value D thus obtained, it is judged according to the following equation (36) whether or not a tire is reduced in air pressure:

$$D < -D_{TH1} \text{ or } D > D_{TH2} \quad (36)$$

Figure 6:
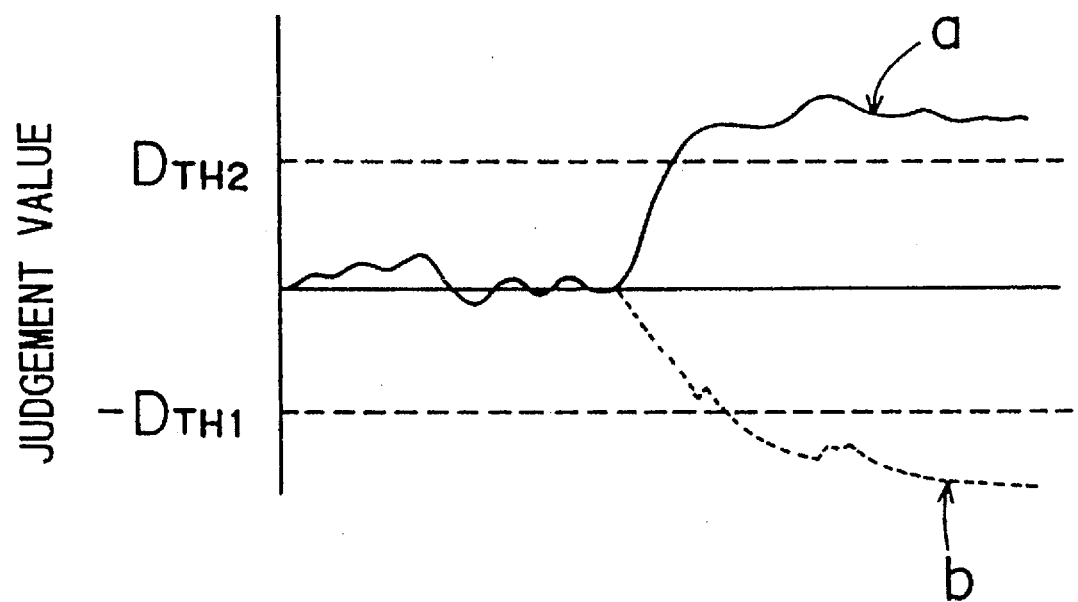
FIG. 6 is a view illustrating a method of judging a reduction in air pressure.

When the judgement value D deviates from the range from $-D_{TH1}$ to $D_{TH2}$ as shown at a and b in FIG. 6, it is judged that a tire is reduced in air pressure. On the other hand, when the judgement value D is located in the range from $-D_{TH1}$ to $D_{TH2}$, it is judged that no tire is reduced in air pressure.

In the manner above-mentioned, a reduction in air pressure is detected while the vehicle actually travels. It may be good to detect a reduction in air pressure and to inform the driver of such a fact. However, it may be better to inform the driver of which tire $W_i$ is reduced in air pressure. Thus, the following description will discuss a method of specifying a tire $W_i$ reduced in air pressure.

Based on the judgement value D obtained according to the equation (35), when D is greater than 0, it can be specified that it is the tire $W_1$ or $W_4$ that is being depressurized, and when D is smaller than 0, it can be specified that it is the tire $W_2$ or $W_3$ that is being depressurized. Now, it is supposed that the vehicle is under linear travelling. Then, it can be specified that it is the tire $W_1$ that is being depressurized when $F_{10}$ is greater than $F_{20}$, that it is the tire $W_2$ that is being depressurized when $F_{10}$ is smaller than $F_{20}$, that it is the tire $W_3$ that is being depressurized when $F_{30''}$ is greater than $F_{40''}$, and that it is the tire $W_4$ that is being depressurized when $F_{30''}$ is smaller than $F_{40''}$.

When a tire $W_i$ reduced in air pressure is specified, the result is supplied to and displayed on the display 4. For example, as shown in FIG. 2, the display 4 is arranged such that display lamp corresponding to any of the four tires $W_1$ to $W_4$ comes on. When a tire reduced in air pressure can not be specified, all of display lamps corresponding to the four tires $W_1$ to $W_4$ comes on.

According to the tire air-pressure reduction detecting apparatus of this embodiment, the rotational angular speeds $F_{30}$, $F_{40}$ affected by a change in front/rear wheel ratio Z due to a vehicle speed, are corrected according to the speed. This eliminates the influence of the change in front/rear wheel ratio Z due to the speed. Further, the rotational angular speeds $F_{30'}$, $F_{40'}$ free from the influence of the change in front/rear wheel ratio Z due to the speed, are further corrected according to the forward/backward acceleration. This eliminates the influence of a change in front/rear wheel ratio Z due to the forward/backward acceleration. Accordingly, the rotational angular speeds can be obtained more accurately. Thus, a reduction in air pressure can be detected with high precision regardless of the vehicle speed and the forward/backward acceleration.

Figure 10:
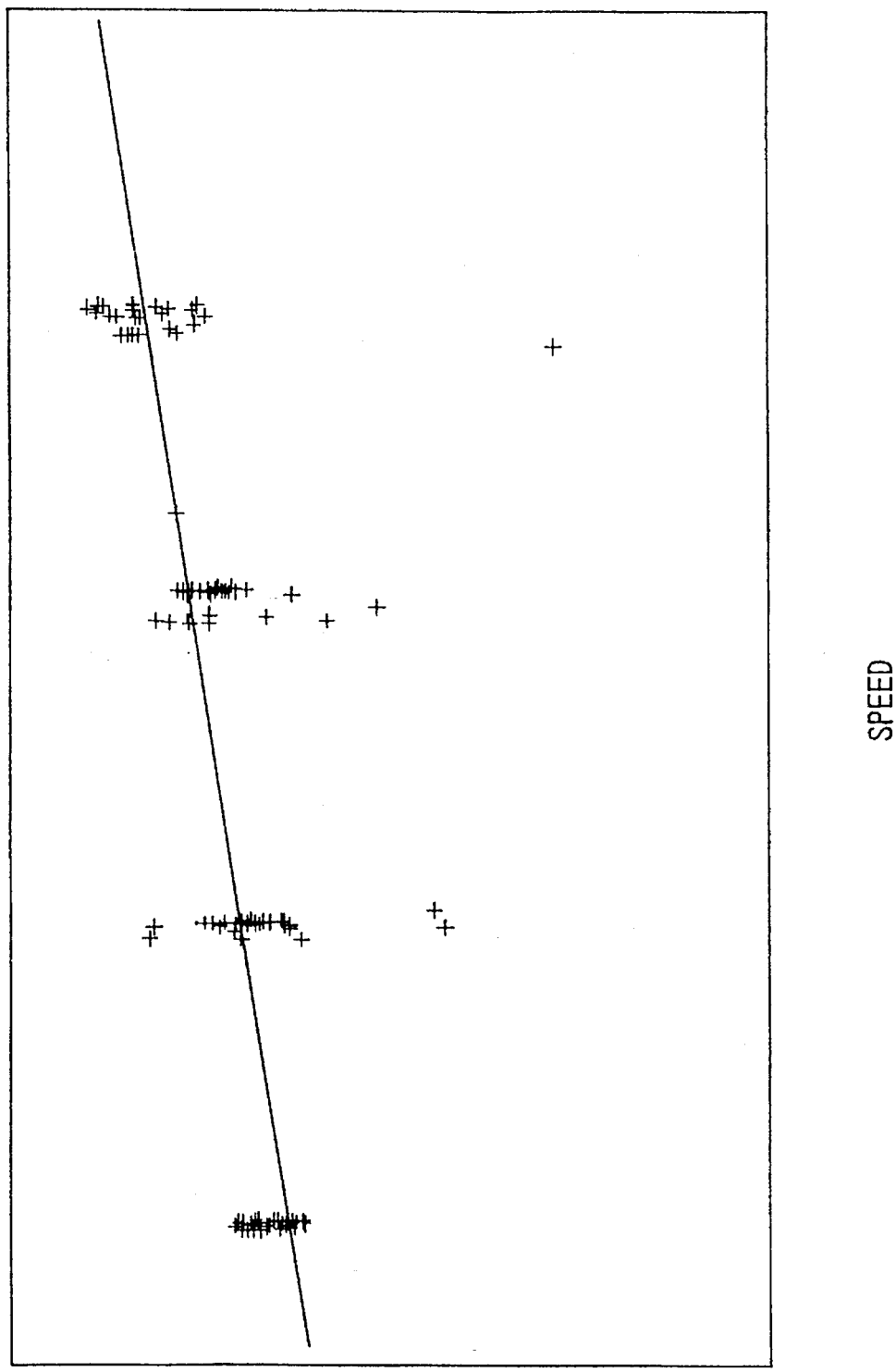
FIG. 10 is a graph illustrating variations of the front/rear wheel ratio with respect to the speed in the tire air-pressure reduction detecting apparatus.

Thus, the first embodiment has been discussed, but the present invention should not be limited to this first embodiment. For example, the description in connection with the first embodiment has been made of a front-wheel drive vehicle, but in a rear-wheel drive vehicle too, variations of the front/rear wheel ratio can be eliminated likewise in the first embodiment. In a rear-wheel drive vehicle, the line graph equivalent to that in FIG. 10 is downwardly inclined in the right direction. Further, in a four-wheeled vehicle, it is considered that the front/rear wheel ratio varies with a vehicle speed. Accordingly, the present invention can also be applied to such a four-wheeled vehicle.

In the first embodiment, the description has been made of a case where the ROM $2c$ stores the formula of relationship between speed and front/rear wheel ratio $f(V)$ or the formula of relationship between forward/backward acceleration and front/rear wheel ratio $f(A)$. Alternately, the ROM $2c$ may contain, for example, speeds or forward/backward accelerations and front/rear wheel ratios in the form of tables. In such an arrangement, the CPU $2b$ is not required to execute an operational processing by putting a vehicle speed or a forward/backward acceleration in a formula of relationship to obtain a front/rear wheel ratio for the speed. This reduces the burden of the CPU $2b$.

Further, the first embodiment is arranged such that the processing of correcting the rotational angular speeds is executed after the initial correction processing has been executed, but provision may be made such that the processing of correcting the rotational angular speeds is executed before the initial correction processing is executed.

Further, the first embodiment is arranged such that the rotational angular speeds $F_i$ are subjected to correction of initial differences, correction according to the speed and correction according to the forward/backward acceleration. However, provision may be made such that these corrections are independently carried out. More specifically, provision may be made such that there are executed only the correction of initial differences and the correction according to the forward/backward acceleration with no correction according to the speed executed. On the contrary, provision may be made such that there are executed only the correction of initial differences and the correction according to the speed.

Further, in the first embodiment, the correction coefficients $C_i$ are defined as the ratios of the rotational angular speeds of the driving tires to the rotational angular speeds of the non-driving tires. However, the present invention may be applied even though the correction coefficient $C_i$ are defined as the ratios of the rotational angular speeds of the non-driving tires to the rotational angular speeds of the driving tires. In this case, the front/rear wheel ratio Z may be obtained from the average=$(\alpha''+\beta''+\gamma''+\delta'')/4$ of $\alpha''$, $\beta''$, $\gamma''$, $\delta''$ which are the ratios of the rotational angular speeds of the non-driving tires to the rotational angular speeds of the driving tires and which are obtained according to the following equations (37) to (40):

$$\alpha''=F_{30}/F_{10} \quad (37)$$

$$\beta''=F_{40}/F_{10} \quad (38)$$

$$\gamma''=F_{30}/F_{20} \quad (39)$$

$$\delta''=F_{40}/F_{20} \quad (40)$$

IV. Second Embodiment

The second embodiment is so arranged as to execute a processing of detecting a reduction in the air pressure of each of the tires $W_i$ of a vehicle under usual travelling when the initial correction processing is finished. More specifically, the CPU $2b$ is so arranged as to multiply the correction coefficients $C_i$ by rotational angular speeds $F_i$ detected per sampling period $\Delta T$, thereby to obtain corrected values $F_{i0}$ of the rotational angular speeds $F_i$:

$$F_{10}=C_1 \times F_1 \quad (41)$$

$$F_{20}=C_2 \times F_1 \quad (42)$$

$$F_{30}=C_3 \times F_1 \quad (43)$$

$$F_{40}=C_4 \times F_1 \quad (44)$$

Thereafter, the corrected rotational angular speeds $F_{i0}$ are used for detecting a reduction in the air pressure of the tires $W_i$. Such a reduction is detected based on a judgement value D obtained according to the following equation (45):

$$D = \frac{\frac{F_{10}+F_{40}}{2} - \frac{F_{20}+F_{30}}{2}}{\frac{F_{10}+F_{20}+F_{30}+F_{40}}{4}} \times 100 \, (\%) \quad (45)$$

Judgement value D may be obtained according to the equations (31), (32) and (35).

When the vehicle is under travelling at a high speed, the judgement value D thus obtained is not accurate due to the action of a centrifugal force as discussed in the column "BACKGROUND OF THE INVENTION". To bring the judgement value D into an accurate value, the second embodiment is arranged to execute a speed correction processing on the judgement value D.

This speed correction processing is a processing according to the present invention and to be executed based on a formula of relationship between the square value of a vehicle speed V' and the average of judgement values D. The speed V' can be obtained from the average $V'=(V_{10}+V_{20}+V_{30}+V_{40})/4$ of the speeds $V_{i0}$ ($V_{i0}=R \times F_{i0}$) of the tires $W_i$ calculated based on the corrected rotational angular speeds $F_{i0}$. It is noted that the speed V' may alternately be obtained, for example, by acquiring a signal from a speed meter previously attached to the vehicle, or by any of a variety of other means capable of obtaining the vehicle speed.

As above-mentioned, the formula of relationship between the square value of the vehicle speed V' and the average of judgement values D, has been obtained and stored in the ROM $2c$ before the tire air-pressure reduction detecting apparatus is forwarded from the factory. In the following, how to obtain such a formula of relationship is first discussed, and the speed correction processing is then discussed in detail.

First, while the inner pressures of three tires out of the four tires $W_1$ to $W_4$ are maintained normal, one tire Wi is reduced in air pressure to a certain extent, (e.g., 30% for the following reason. At the time the vehicle travels at 180 km/h, when a tire is reduced in air pressure by 50%, the tire has much possibility of bursting; accordingly, a tire is reduced in air pressure by 30%, just prior to bursting). Here, the tire $W_i$ is reduced in air pressure for the following reason. It is intended to obtain the formula of relationship by actually measuring to which extent the judgement value D varies with the speed when the air pressure is actually reduced. In such a state, the vehicle travels at a certain speed V' and the judgement value D is obtained based on the equation (45) during travelling. Since the judgement value D is obtained per sampling period $\Delta T$, the average of judgement values D for all sampling periods $\Delta T$ is actually used as the judgement value D at the speed V'. The operation above-mentioned is executed for each of speeds V' of 20 km/h, 30 km/h, 40 km/h, ..., 180 km/h, and the judgement value D is obtained for each of the speeds V'. The operations above-mentioned are conducted for all the tires $W_i$ for obtaining the judgement value D for each of the speeds V' for each of the tires $W_i$.

Figure 7:
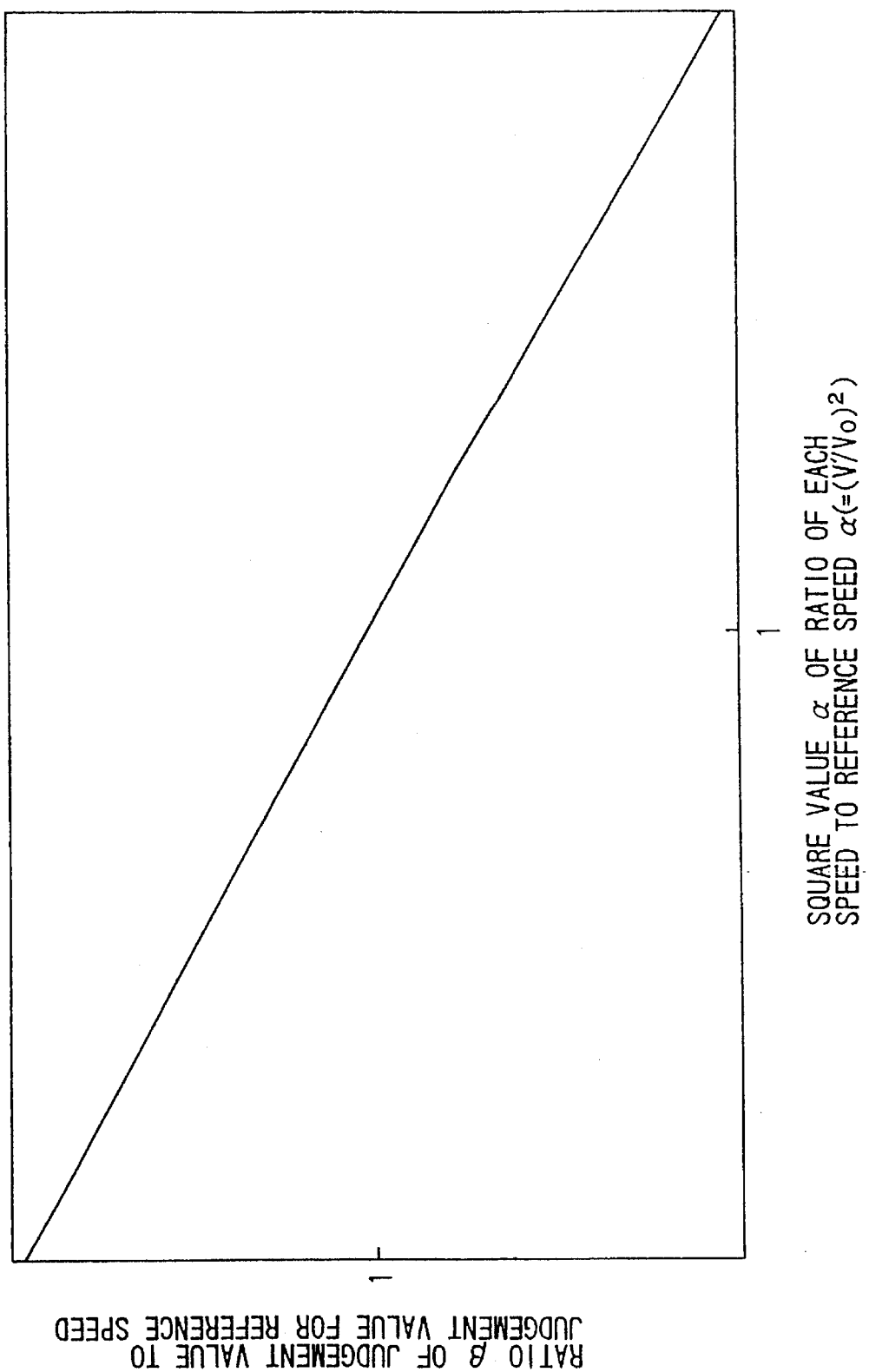
FIG. 7 is a graph illustrating variations of the judgement value with respect to speed variations in the tire air-pressure reduction detecting apparatus.

When the judgement value D for each of the speeds V' for each of the tires $W_i$ is obtained, the average $D_{AV}$ of the absolute value of the judgement values D of the four tires $W_i$ for each of the speeds V' is then obtained. On the other hand, a suitable speed V' (for example, V'=120 km/h) out of the speeds V' is set as a reference speed $V_0$. Then, there is drawn a graph in which the axis of abscissa presents the square value $\alpha(=V'/V_0)^2$ of the ratio of each speed V' to the reference speed $V_0$ and the axis of ordinate presents the ratio $\beta(=D_{AV}/D_{AV0})$ of the average $D_{AV}$ for each speed V' to the average $D_{AV0}$ for the reference speed $V_0$. As shown in FIG. 7 for example, the graph is drawn in the form of a straight line downwardly inclined in the right direction, and the value $\beta$ on the axis of ordinate at the reference speed $V_0$, becomes 1. The graph is drawn in the form of a straight line downwardly inclined in the right direction for the following reason. As the speed becomes faster, a centrifugal force is exerted more to the tires $W_i$ to reduce the judgement values D. Further, the value $\beta$ on the axis of ordinate becomes zero when the vehicle speed is, for example, about 250 km/h. Accordingly, $\beta$ is normally positive.

Based on the graph thus drawn, a formula of relationship $f(\alpha)$ between the square value $\alpha$ of the ratio of each speed to the reference speed and the ratio $\beta$ between the averages of judgement values D, is obtained using a method of least squares for example. Since the graph is a straight line downwardly inclined in the right direction, the formula of relationship $f(\alpha)$ can be obtained in the form of a linear equation such as $f(\alpha)=-a\alpha+b$ or the like. Here, a and b are constants. The formula $f(\alpha)$ thus obtained is stored in the ROM $2c$.

The following description will discuss the speed correction processing to be executed while the vehicle actually travels.

The speed correction processing is to be executed while the vehicle actually travels. In this speed correction processing, the vehicle speed V' is calculated based on the corrected rotational angular speeds $F_{i0}$ obtained in the air-pressure reduction detection processing. The speed V' thus calculated is put in the formula of relationship $f(\alpha)$ stored in the ROM $2c$. As a result, there is obtained the ratio $f(\alpha)$ for a judgement value corresponding to the calculated speed V' on a one-for-one basis. Based on the judgement value ratio $f(\alpha)$ thus obtained, the judgement value D detected by the air-pressure reduction detection processing is corrected as follows:

$$D'=(1/f(\alpha))\times D \quad (46)$$

Thus, the speed correction processing is carried out. When this speed correction processing is finished, using the corrected value D' it is judged according to the following formula (47) whether or not a tire is reduced in air pressure:

$$D'<-D_{TH1} \text{ or } D'>D_{TH2} \quad (47)$$

When the judgement value D' deviates from the range from $-D_{TH1}$ to $D_{TH2}$ as shown at a and b in FIG. 6, it is judged that a tire is reduced in air pressure. On the other hand, when the judgement value D' is located in the range from $-D_{TH1}$ to $D_{TH2}$, it is judged that a tire is not reduced in air pressure.

In the manner above-mentioned, a reduction in air pressure is detected while the vehicle actually travels. It may be better to inform the driver of which tire $W_i$ is reduced in air pressure than to detect a reduction in air pressure and to inform the driver of such detection only. Thus, there is then specified a tire $W_i$ reduced in air pressure. The tire specifying method, which is the same as that discussed in the first embodiment, is not again discussed here.

When a tire $W_i$ reduced in air pressure is specified, the result is supplied to and displayed on the display 4. The display mode in the display 4 is the same as that discussed in the first embodiment.

As thus discussed, the tire air-pressure reduction detecting apparatus of the second embodiment is arranged such that the judgement value D calculated according to the vehicle speed is corrected by the speed correction processing. It is therefore possible to disregard the influence of, for example, tread lifting generated while the vehicle travels at a high speed. Accordingly, a reduction in air pressure can securely be detected even during high-speed travelling.

The second embodiment has been discussed, but the present invention should not be limited thereto. For example, the second embodiment is arranged such that the judgement value D is corrected by the speed correction processing, but provision may be made such that, instead of the judgement value D, the threshold values $D_{TH1}$, $D_{TH2}$ are corrected as follows:

$$D_{TH1}'=f(\alpha)\times D_{TH1} \quad (48)$$

$$D_{TH2}'=f(\alpha)\times D_{TH2} \quad (49)$$

Then, it is judged whether or not the uncorrected judgement value D satisfies the following judging formula (50):

$$D<-D_{TH1'} \text{ or } D>D_{TH2'} \quad (50)$$

When the judgement value D satisfies the judging formula (50), it is judged that a tire is reduced in air pressure. On the other hand, when the judgement value D does not satisfy the judging formula (50), it is judged that no tire is reduced in air pressure.

According to this modified speed correction processing, the threshold values $D_{TH1}$, $D_{TH2}$ are corrected according to the speed V'. Accordingly, even though the judgement value D is calculated low due to the influence of tread lifting while the vehicle travels at a high speed, a reduction in air pressure can securely be detected.

The second embodiment is arranged such that the ROM 2c previously contains the formula of relationship $f(\alpha)$ between the square value $\alpha$ of the ratio of each speed V' to the reference speed $V_0$ and the ratio $\beta$ of the judgement value $D_{AV}$ for each speed V' to the judgement value $D_{AV0}$ for the reference speed $V_0$. However, the values in the formula of relationship for speeds V' may be obtained and stored in the ROM 2c in the form of tables. In such an arrangement, there is saved, in the CPU 2b, the time during which the value in the formula of relationship for each speed V' is operated.

V. Third Embodiment

As discussed in the column "BACKGROUND OF THE INVENTION", the air-pressure reduction detection using the judging formula (1) is based on the fact that, when the dynamic load radius of a tire $W_i$ undergoes a change, the rotational angular speed $F_i$ of the tire $W_i$ is changed with respect to the rotational angular speeds $F_j$ of other tires $W_j$.

However, the dynamic load radius of a tire $W_i$ varies not only with a reduction in air pressure, but also with the load exerted to the tire, the rotational speed thereof, the slip angle thereof, the camber angle thereof, whether the vehicle is under acceleration or braking, whether or not the vehicle is under cornering, and the wear of the tire.

To accurately detect a reduction in the air pressure of a tire, it is required to eliminate variations of the dynamic load radius of the tire and it is therefore preferable to inhibit a detection of a reduction in air pressure of the tire which is under a certain specific condition. More specifically, it is preferable to inhibit the detection of a reduction in air pressure under any of the following specific conditions:

① when the vehicle speed is low such that the wheel speed sensors are lowered in detection precision;
② when the vehicle is suddenly increased in speed such that the tires are liable to slip;
③ when the vehicle is under cornering such that the tires are liable to skid, and when the curvature radius of the road is smaller than a predetermined threshold value;
④ when the vehicle is under cornering such that the tires are liable to skid, and when the lateral G generated at that time is greater than a predetermined threshold value:
⑤ when the vehicle is changed in state from a linear travelling to cornering, or from cornering to a linear travelling such that the load movement or the like in the vehicle becomes unstable; and
⑥ when a parking brake or an ABS (antilocked braking system) attached to a vehicle liable to slip, is under operation.

As discussed in the column "BACKGROUND OF THE INVENTION", judgement values D obtained according to the judging formula (1) or (35), (45) are different from one another dependent on which tires $W_i$ are reduced in air pressure. Accordingly, when a judgement value D is used as it is, a reduction in air pressure cannot securely be detected. In the third embodiment, therefore, the judgement value D is subjected to a judgement value correction processing in order to securely detect a reduction in air pressure.

This judgement value correction processing is a processing according to the present invention and to be executed based on correction coefficients $C_{ni}$ obtained and stored in the ROM 2c before the tire air-pressure reduction detecting apparatus is forwarded from the factory. As will be discussed later, the correction coefficients $C_{ni}$ vary with tires $W_i$ reduced in air pressure. Accordingly, in this judgement value correction processing, it is required to select a proper correction coefficient $C_{ni}$ dependent on a tire $W_i$ reduced in air pressure. It is also required to specify a tire with much possibility of its air pressure being reduced. In the following, the description will discuss first how to obtain the correction coefficients $C_{ni}$, then a processing for specifying a tire with much possibility of its air pressure being reduced, and finally how to correct the judgement value.

A method of obtaining the correction coefficients $C_{ni}$ will now be described. First, one tire out of the four tires $W_1$ to $W_4$ is reduced in air pressure to a certain extent (for example, 30%) while the inner pressures of other three tires $W_i$ are maintained normal. In such a state, the vehicle is subjected to a test running, and the judgement value D is obtained according to the judging formula (1) or (35), (45). Since the judgement value D is obtained per sampling period $\Delta T$, the average of judgement values D for all sampling periods $\Delta T$ is actually used as the judgement value D. The operation above-mentioned is executed for each of tires $W_i$ and the judgement value D is obtained for each of the tires $W_i$.

On the other hand, the tire $W_1$ for example is selected, as a reference tire, out of the tires $W_1$ to $W_4$. There are obtained the ratios of judgement values $D_2$, $D_3$, $D_4$ respectively obtained at the time the other tires $W_2$, $W_3$, $W_4$ are depressurized, to a judgement value $D_1$ obtained at the time the reference tire $W_1$ is depressurized. These ratios are defined as $C_{n1}$, $C_{n2}$, $C_{n3}$, $C_{n4}$, which are obtained as follows:

$$C_{n1}=D_1/D_1 \tag{51}$$

$$C_{n2}=D_1/D_2 \tag{52}$$

$$C_{n3}=D_1/D_3 \tag{53}$$

$$C_{n4}=D_1/D_4 \tag{54}$$

These ratios serve as correction coefficients, and the correction coefficients $C_{n1}$, $C_{n2}$, $C_{n3}$, $C_{n4}$ are stored in the ROM 2c.

The following description will discuss a processing for specifying a tire $W_i$ with much possibility of its air pressure being reduced.

Figure 8:
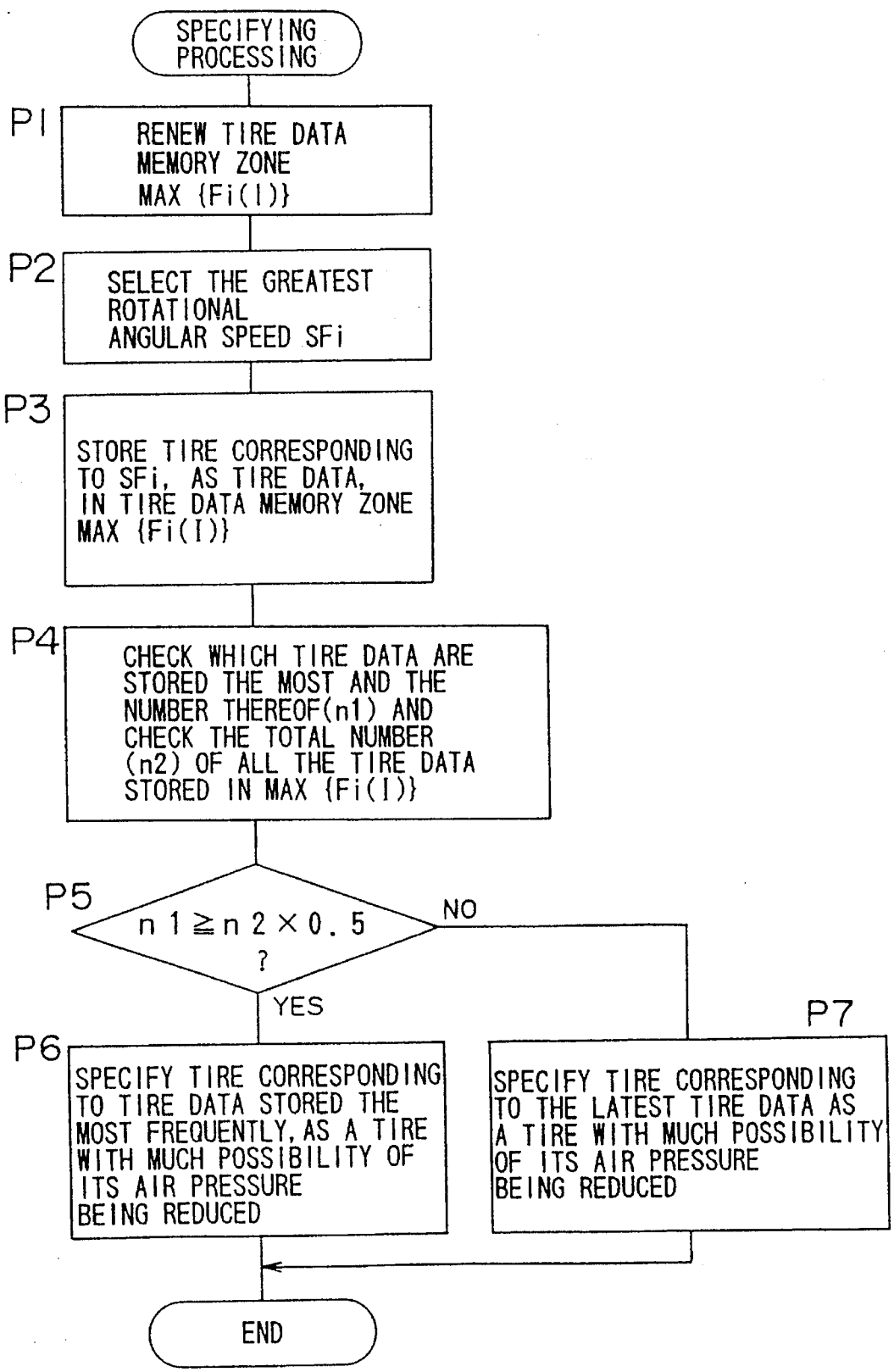
FIG. 8 is a flow chart illustrating a processing for specifying a tire with much possibility of its air pressure being lowered, in the tire air-pressure reduction detecting apparatus.

FIG. 8 is a flow chart illustrating a processing of specifying a tire $W_i$ with much possibility of its air pressure being reduced. As mentioned earlier, the RAM 2d contains a memory zone MAX $\{F_i(I)\}$ as an arrangement for specifying a tire $W_i$ with much possibility of its air pressure being reduced. In this MAX $\{F_i(I)\}$, it is now supposed that I=n contains tire data obtained at the latest sampling period and that I=n–1, n–2, . . . , 1 respectively contain tire data obtained at prior sampling periods by 1, 2, . . . , n sampling periods.

In the CPU 2b, the tire data in MAX $\{F_i(I)\}$ are forwardly shifted one by one to renew tire data beforehand stored therein (Step P1). More specifically, there are repeatedly executed such operations of substituting MAX $\{F_i(2)\}$ for MAX $\{F_i(I)\}$, substituting MAX $\{F_i(3)\}$ for MAX $\{F_i(2)\}$ and so on, until I becomes equal to n.

Generally, a tire $W_i$ reduced in air pressure is reduced in dynamic load radius as compared with other tires $W_j$. Accordingly, the rotational angular speed $F_i$ is correspondingly faster. Thus, there is selected the greatest rotational angular speed $SF_i$ after initial correction (there are considered a variety of ways of executing initial correction available; when the way of executing initial correction according to the first Embodiment is used, F10, F20. F30" and F40" correspond to the rotational angular speed $SF_i$ after initial correction) out of the rotational angular speeds $SF_i$ obtained based on the outputs of the vehicle wheel speed sensors 1 (Step P2). A tire $W_i$ corresponding to the rotational angular speed $SF_i$ thus selected, is stored, as tire data, in MAX $\{F_i(I)\}$ (Step P3). Then, it is checked which tire data are stored the most frequently out of the tire data stored in MAX $\{F_i(I)\}$, and there are also checked the number $n_1$ of the stored tire data and the total number $n_2$ of all the tire data stored in MAX $\{F_i(I)\}$ (Step P4).

Then, it is judged whether or not the rate of the number of the most stored tire data $n_1$ to the total number of all the tire data $n_2$ is not less than a predetermined value (for example, 50%: $n_1 \geq n_2 \times 0.5$) (Step P5). More specifically, when the rate of the number of the most stored tire data $n_1$ to the total number $n_2$, is less than a predetermined value, this involves a great likelihood that a tire $W_i$ corresponding to those tire data has been increased in rotational angular speed $SF_i$ by other reasons than its reduced air pressure, such as lateral G exerted at the time of slip or cornering.

When it is judged that the rate of storage number $n_1$ to the total storage number $n_2$ is not less than a predetermined value, the tire $W_i$ corresponding to those tire data is specified as a tire $W_i$ with much possibility of its air pressure being reduced (Step P6). On the other hand, the rate of storage number $n_1$ is less than the predetermined value, the processing may basically be finished. However, sudden blowout or the like of a tire should also be detected. Accordingly, this embodiment is arranged such that, when the rate of the number of storage data $n_1$ is less than a predetermined value, there is specified, as a tire $W_i$ with much possibility of its air pressure being reduced, the tire $W_i$ corresponding to the latest tire data recently stored in the MAX $\{F_i(n)\}$ (Step P7).

Thus, there is specified a tire $W_i$ with much possibility of its air pressure being reduced. The tire $W_i$ thus specified is stored, as it is, in the RAM 2d. This specifying processing may be executed, for example, per sampling period $\Delta T$ or only once while the vehicle engine is started and then stopped. Alternately, this specifying processing may be executed at predetermined regular time intervals (for example 30 minutes).

The following description will discuss how to correct the judgement value.

Such correction is to be carried out based on the correction coefficient $C_{ni}$ for a tire $W_i$ specified by the specifying processing. More specifically, when a tire $W_i$ with much possibility of its air pressure being reduced is specified by the specifying processing, the correction coefficient $C_{ni}$ stored as corresponding to this tire $W_i$ is read from the ROM 2c and the correction coefficient $C_{ni}$ is multiplied by the judgement value D obtained by the air-pressure reduction detection processing, thus correcting the judgement value D. A corrected judgement value D' is expressed as follows:

$$D'=Cn_i \times D \tag{55}$$

Thus, the judgement value is corrected. Using the judgement value D' obtained by such correction, it is judged according to the following formula (56) whether or not the tire is reduced in air pressure:

$$D'<-D_{TH1} \text{ or } D'>D_{TH2} \tag{56}$$

When the judgement value D' deviates from the range from $-D_{TH1}$ to $D_{TH2}$ as shown at a and b in FIG. 6, it is judged that the tire is reduced in air pressure. On the other hand, when the judgement value D' is located in the range from $-D_{TH1}$ to $D_{TH2}$, it is judged that the tire is not reduced in air pressure.

Thus, a judgement is made on a reduction in air pressure. When it is judged that the air pressure is reduced, there is supplied to and displayed on, the display 4 (See FIG. 5), the fact that the tire $W_i$ specified by the specifying processing is reduced in air pressure. The display mode of the display 4 has already been discussed.

As thus discussed, according to the tire air-pressure reduction detecting apparatus of the third embodiment, a tire $W_i$ with much possibility of its air pressure being reduced, is specified based on the correction coefficients $C_{ni}$ obtained in the past, and the judgement value D obtained is corrected by the correction coefficient $C_{ni}$ corresponding to the tire $W_i$ thus specified. This restrains variations of the judgement values D dependent on which tires $W_1$ to $W_4$ are reduced in air pressure. Thus, whichever may a tire $W_i$ be reduced in air pressure, such a reduction can securely be detected.

The third embodiment has been discussed, but the present invention should not be limited thereto. For example, the third embodiment is arranged such that the judgement value D is corrected by the judgement value correction processing, but provision may be made such that the threshold values $D_{TH1}$, $D_{TH2}$ are corrected instead of the judgement value D. The processing of correcting the threshold values is the same as that discussed in connection with the second embodiment, and therefore not discussed here again.

According to this modified speed correction processing, the threshold values $D_{TH1}$, $D_{TH2}$ are corrected according to a tire $W_i$ with much possibility of its air pressure being reduced. Accordingly, there are obtained threshold values according to the tires Wi. It is therefore possible to make a judgement on a reduction in air pressure according to variations of the judgement values D dependent on which tires $W_1$ to $W_4$ are reduced in air pressure. Thus, whichever may a tire $W_i$ be reduced in air pressure, such a reduction can securely be detected.

In the third embodiment, there has been discussed, as a method of specifying a tire $W_i$ with much possibility of its air pressure being reduced, a method of specifying such a tire based on the tire data stored in the past. However, provision may be made such that a tire $W_i$ in danger of its air pressure being reduced, is specified, for example, based on the judgement value D and the corrected rotational angular speeds $F_{i0}$ obtained by the air-pressure reduction detection processing. The processing of specifying such a tire $W_i$ is the same as that discussed in connection with the first embodiment, and therefore not discussed here again.

Figure 9:
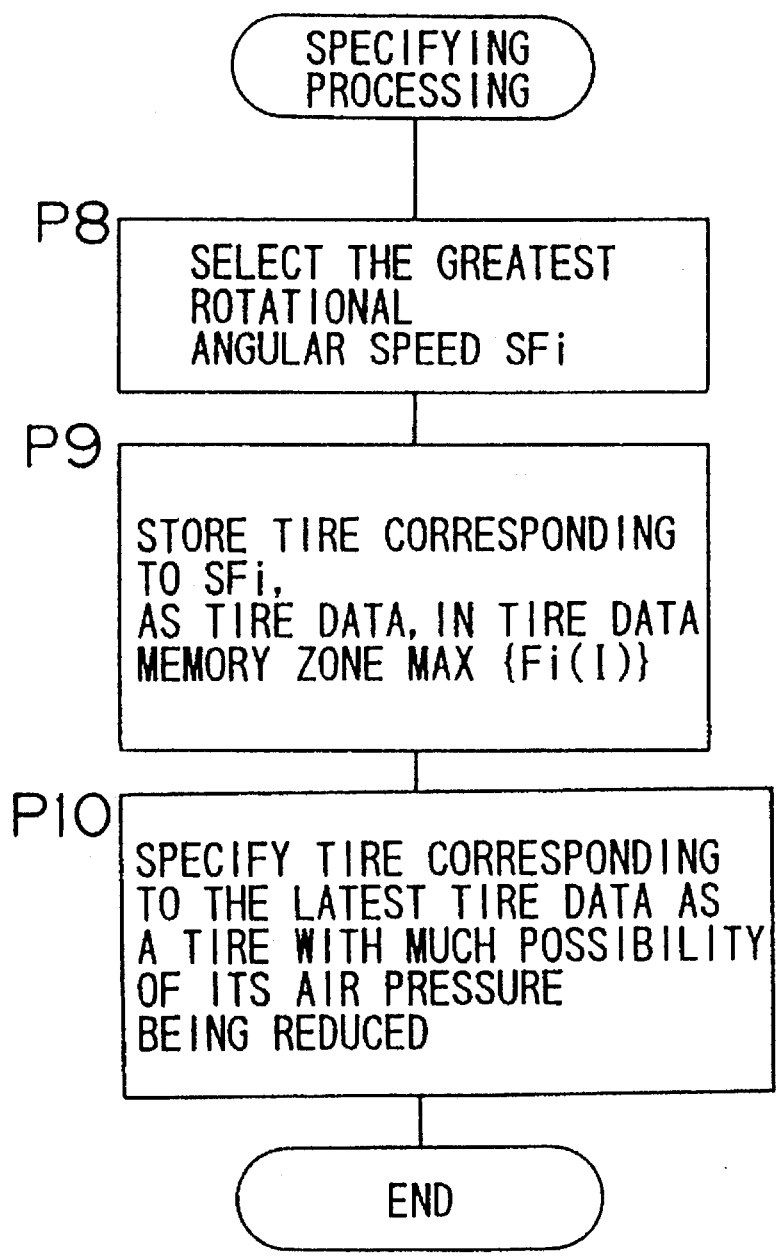
FIG. 9 is a flow chart illustrating another example of the processing for specifying a tire with much possibility of its air pressure being lowered.

In the third embodiment, as far as the number of tire data most stored in the MAX $\{F_i (I)\}$ serving as the tire data memory zone in the RAM 2d, is less than a predetermined number $n_1$, the tire $W_i$ corresponding to the latest tire data is specified as a tire $W_i$ with much possibility of its air pressure being reduced. However, provision may be made, as shown in FIG. 9 for example, such that the tire $W_i$ corresponding to the latest tire data out of the tire data stored in MAX $\{F_i (I)\}$, is specified as a tire $W_i$ with much possibility of its air pressure being reduced (Steps P8 to P10).

I claim:

1. A tire air-pressure reduction judging method of detecting rotational angular speeds of the four tires attached to a four-wheeled vehicle and detecting a reduction in the air pressure of a tire based on the detected rotational angular speeds, said method comprising the steps of:

obtaining, as functions of speeds or forward/backward accelerations, the ratios of the rotational angular speeds of driving tires under normal pressure to the rotational angular speeds of non-driving tires under normal pressure, and storing the relationship between said speeds or forward/backward accelerations and said ratios thus obtained;

obtaining the speed or forward/backward acceleration of the vehicle while the vehicle actually travels;

obtaining, based on said stored relationship, the ratio corresponding to said speed or forward/backward acceleration thus obtained;

correcting said rotational angular speeds based on said ratio thus obtained; and detecting a reduction in the air pressure of a tire based on said rotational angular speeds thus corrected.

2. A tire air-pressure reduction judging method of:

detecting the rotational angular speeds of the four tires attached to a four-wheeled vehicle; obtaining, according to a judging formula based on the detected rotational angular speeds, a judgement value for judging whether or not a tire is reduced in air pressure; comparing the judgement value thus obtained with threshold values; and judging based on the result of comparison of whether or not a tire is reduced in air pressure, said method comprising the steps of:

causing the vehicle to travel at each of predetermined speeds with one tire thereof depressurized and the other tires thereof at normal pressure, obtaining judgement values at said speeds according to said judging formula, setting, as a reference judgement value, the judgement value for a predetermined reference speed out of said obtained judgement values, storing the relationship between the ratios of said other obtained judgement values to said reference judgement value, and said speeds;

calculating the speed of the vehicle while the vehicle actually travels;

obtaining, based on said stored relationship, the ratio corresponding to said calculated speed; and correcting, based on said ratio thus obtained, said judgement value obtained according to said judging formula, or said threshold values.

3. A tire air-pressure reduction detecting apparatus having: rotational angular speed detecting means for detecting the rotational angular speeds of the four tires attached to a four-wheeled vehicle; judgement value operating means for putting, in a judging formula, said rotational angular speeds detected by said rotational angular speed detecting means, thereby to obtain a judgement value for judging whether or not a tire is reduced in air pressure; comparing means for comparing said judgement value obtained by said judgment value operating means with threshold values; and judging means for judging, based on the result of comparison made by said comparing means, whether or not a tire is reduced in air pressure, said tire air-pressure reduction detecting apparatus comprising:

memory means for memorizing each of predetermined travelling speeds at which the vehicle travels with one tire thereof depressurized and the other tires thereof at normal pressure, for obtaining judgement values at said speeds according to said judging formula, for setting, as a reference judgement value, the judgement value for a predetermined reference speed out of said obtained judgement values, and for storing the relationship between the ratios of the said other obtained judgement values to said reference judgement value, and said speeds; and speed calculating means for calculating the vehicle speed while the vehicle actually travels;

said judgement value operating means being adapted to obtain, based on said relationship stored in said memory means, the ratio corresponding to said calculated speed and to correct, based on said ratio thus obtained, said judgement value obtained according to said judging formula, or said threshold values.

4. A tire air-pressure reduction judging method of detecting the rotational angular speeds of the four tires attached to a four-wheeled vehicle, putting said detected rotational angular speeds in a judging formula, thereby to obtain a judgement value for judging whether or not a tire is reduced in air pressure, comparing said judgement value thus obtained with threshold values, and detecting a reduction in the air pressure of a tire based on the result of such comparison, said tire air-pressure reduction judgement method comprising the steps of:

obtaining judgement values according to the judging formula while causing the vehicle to travel with one tire thereof depressurized and the other tires thereof at normal pressure, setting a reference tire out of said tires, and storing the ratios of the judgement values for other tires than said reference tire, to the judgement value for said reference tire, said ratios being stored as respectively corresponding to said tires;

specifying, based on said detected rotational angular speeds, a tire which satisfies a predetermined specific condition relating to a reduction in air pressure, such specifying operation being made when the vehicle actually travels;

reading the ratio stored as corresponding to said specified tire; and correcting, based on said read ratio, said judgement value obtained according to said judging formula, or said threshold values.

5. A tire air-pressure reduction judging method according to claim 4, said specifying step comprising:

selecting a tire which has generated the greatest rotational angular speed out of the rotational angular speeds detected, storing tire data for a predetermined period of time representing said selected tire, selecting the most frequently stored tire data thus stored, and only when the rate of the number of said selected tire data to the total number of all the tire data stored is not less than a predetermined value, specifying the tire corresponding to said selected tire data as a tire which satisfies a predetermined specific condition relating to a reduction in air pressure.

6. A tire air-pressure reduction judging method according to claim 4, said specifying step comprising:

selecting a tire which has generated the greatest rotational angular speed out of the rotational angular speeds detected, storing tire data for a predetermined period of time representing said selected tire, selecting the tire corresponding to the latest tire data out of the tire data thus stored, as a tire which satisfies a predetermined specific condition relating to a reduction in air pressure.

7. A tire air-pressure reduction judging method according to claim 4, said specifying step comprising:

selecting a tire which has generated the greatest rotational angular speed out of the rotational angular speeds detected, storing tire data for a predetermined period of time representing said selected tire, selecting the most frequently stored tire data thus stored, and when the rate of the number of said selected tire data to the total number of all the tire data stored, is less than a predetermined value, specifying the tire corresponding to the latest tire data out of the tire data thus stored, respectively as a tire which satisfies a predetermined specific condition relating to a reduction in air pressure.

8. A tire air-pressure reduction detecting apparatus having: rotational angular speed detecting means for detecting the rotational angular speeds of the four tires attached to a four-wheeled vehicle; judgement value operating means for putting, in a judging formula, said rotational angular speeds detected by said rotational angular speed detecting means, thereby to obtain a judgement value for judging whether or not a tire is reduced in air pressure; comparing means for comparing said judgement value obtained by said judgement value operating means with threshold values; and judging means for judging, based on the result of comparison made by said comparing means, whether or not a tire is reduced in air pressure, said tire air-pressure reduction detecting apparatus comprising:

ratio operating means for previously obtaining judgement values according to the judging formula while the vehicle travels with one tire thereof depressurized and the other tires thereof at normal pressure, for setting a reference tire out of said tires, and for obtaining the ratios of the judgement values for other tires than said reference tire, to the judgement value for said reference tire;

memory means for storing said ratios obtained by said ratio operating means, said ratio being stored as respectively corresponding to said tires; and specifying means for specifying, based on said detected rotational angular speeds, a tire which satisfies a predetermined specific condition relating to a reduction in air pressure, such specifying operation being made when the vehicle actually travels;

said judgement value operating means being adapted to read, from said memory means, the ratio obtained and stored as corresponding to said tire specified by said specifying means, and to correct, based on said read ratio, said judgement value obtained according to said judging formula, or said threshold values.

9. A tire air-pressure reduction detecting apparatus according to claim 8, wherein the specifying means comprises:

a selecting unit for selecting a tire which has generated the greatest rotational angular speed out of the rotational angular speeds detected by the rotational angular speed detecting means; and a memory unit capable of storing tire data representing said tire selected by said selecting unit, said tire data taken for a predetermined period of time being stored; and said specifying means is adapted such that said specifying means selects the most frequently stored tire data out of said tire data stored in said memory unit, and that, only when the rate of the number of said selected tire data to the total number of all the tire data stored in said memory means, is not less than a predetermined value, the tire corresponding to said selected tire data is specified as a tire which satisfies a predetermined specific condition relating to a reduction in air pressure.

10. A tire air-pressure reduction detecting apparatus according to claim 8, wherein the specifying means comprises:

a selecting unit for selecting a tire which has generated the greatest rotational angular speed out of the rotational angular speeds detected by the rotational angular speed detecting means; and a memory unit capable of storing tire data representing the tire selected by said selecting unit, said tire data taken for a predetermined period of time being stored; and said specifying means is adapted to specify, as a tire which satisfies a predetermined specific condition relating to a reduction in air pressure, the tire corresponding to the latest tire data out of the tire data stored in said memory unit.

11. A tire air-pressure reduction detecting apparatus according to claim 8, wherein the specifying means comprises:

a selecting unit for selecting a tire which has generated the greatest rotational angular speed out of the rotational angular speeds detected by the rotational angular speed detecting means; and a memory unit capable of storing tire data representing the tire selected by said selecting unit, said tire data taken for a predetermined period of time being stored; and said specifying means is adapted such that said specifying means selects the most frequently stored tire data out of said tire data stored in said memory unit, and that, when the rate of the number of said selected tire data to the total number of all the tire data stored in said memory means, is less than a predetermined value, the tire corresponding to the latest tire data is specified as a tire which satisfies a predetermined specific condition relating to a reduction in air pressure.

* * * * *